(12) United States Patent
Nishida

(10) Patent No.: US 10,966,554 B1
(45) Date of Patent: Apr. 6, 2021

(54) DRINKING DRAMATIZATION GLASS, DRINKING DRAMATIZATION SYSTEM, REMOTE TOAST COUNTER SYSTEM, STORAGE MEDIUM AND DRINK FREEZE CONTAINER

(71) Applicant: NETAPPLI CO., LTD., Ishikawa (JP)

(72) Inventor: Makoto Nishida, Ishikawa (JP)

(73) Assignee: NETAPPLI CO., LTD., Ishikawa (JP)

( * ) Notice: Subject to any disclaimer, the term of this patent is extended or adjusted under 35 U.S.C. 154(b) by 0 days.

(21) Appl. No.: 17/054,763

(22) PCT Filed: Dec. 11, 2019

(86) PCT No.: PCT/JP2019/048539
§ 371 (c)(1),
(2) Date: Nov. 11, 2020

(87) PCT Pub. No.: WO2020/122138
PCT Pub. Date: Jun. 18, 2020

(30) Foreign Application Priority Data

Dec. 14, 2018 (JP) .............................. JP2018-234173
Aug. 23, 2019 (JP) .............................. JP2019-164942

(51) Int. Cl.
*A47G 19/22* (2006.01)
*G02B 27/10* (2006.01)
(Continued)

(52) U.S. Cl.
CPC ......... *A47G 19/2227* (2013.01); *A47G 23/16* (2013.01); *G02B 27/1006* (2013.01);
(Continued)

(58) Field of Classification Search
CPC ................ B65D 1/265; B65D 81/3865; A47G 19/2227–23; A47G 23/16;
(Continued)

(56) References Cited

U.S. PATENT DOCUMENTS 5,511,685 A * 4/1996 Nelson ............... A47G 19/2227
220/662
5,803,306 A * 9/1998 Lewis ................ A47G 19/2227
220/662
(Continued)

FOREIGN PATENT DOCUMENTS

JP    S6292769 U    6/1987
JP    H0181970 U    6/1989
(Continued)

OTHER PUBLICATIONS

International Search Report (ISR) dated Feb. 18, 2020, issued for International application No. PCT/JP2019/048539. (2 pages).

*Primary Examiner* — Kareen K Thomas
(74) *Attorney, Agent, or Firm* — Law Office of Katsuhiro Arai

(57) ABSTRACT

A drinking dramatization glass (1) incudes: a glass body (10) being a bottomed cylinder with a top opening (11); a fixing mechanism (16) for fixing an image display device (80) on the side face of the glass body; a transparent part (12) for viewing, from the exterior of the glass body, an image displayed on an image display part (101) of the image display device; and a beam splitter (30) placed inside the glass body; wherein the image displayed on the image display part is spectrally dispersed into two images (a reflected image 83 and a transmitted image 84) by the beam splitter, and the two images pass through the transparent part and reach the exterior of the glass body.

14 Claims, 22 Drawing Sheets

(51) Int. Cl.
*G02B 27/14* (2006.01)
*A47G 23/16* (2006.01)

(52) U.S. Cl.
CPC .... *G02B 27/141* (2013.01); *A47G 2019/2238* (2013.01); *A47G 2019/2244* (2013.01); *A47G 2200/205* (2013.01)

(58) Field of Classification Search
CPC .... A47G 2019/2244; A47G 2019/2238; A47G 2200/205; G02B 27/1006; G02B 27/141
See application file for complete search history.

(56) References Cited

U.S. PATENT DOCUMENTS

| | | | |
|---|---|---|---|
| 7,631,781 B2 * | 12/2009 | Chen | A47G 19/2227 |
| | | | 206/217 |
| 8,550,288 B2 | 10/2013 | Briar et al. | |
| 8,672,504 B2 * | 3/2014 | Kramer | A47G 19/2227 |
| | | | 362/154 |
| 9,145,243 B2 * | 9/2015 | Kim | B65D 51/245 |
| 10,139,641 B1 * | 11/2018 | Staton | G02B 30/56 |
| 2002/0095830 A1 * | 7/2002 | Lage | G09F 23/08 |
| | | | 40/324 |
| 2002/0097195 A1 * | 7/2002 | Frank | G09F 23/06 |
| | | | 345/5 |
| 2008/0034627 A1 * | 2/2008 | Schnuckle | G09F 19/12 |
| | | | 40/306 |
| 2008/0100469 A1 | 5/2008 | Goldburt | |
| 2010/0045705 A1 | 2/2010 | Vertegaal et al. | |
| 2011/0088296 A1 | 4/2011 | Schnuckle | |
| 2015/0335183 A1 | 11/2015 | Balachandran et al. | |

FOREIGN PATENT DOCUMENTS

| | | |
|---|---|---|
| JP | H0345213 A | 2/1991 |
| JP | 3045147 U | 1/1998 |
| JP | 3086140 U | 6/2002 |
| JP | 2005099159 A | 4/2005 |
| JP | 2012532804 A | 12/2012 |
| JP | 6337256 B1 | 6/2018 |
| JP | 6406742 B1 | 10/2018 |
| JP | 6432960 B1 | 12/2018 |
| JP | 2019017557 A | 2/2019 |
| JP | 6488049 B1 | 3/2019 |
| JP | 6528162 B1 | 6/2019 |
| WO | 2011005318 A2 | 1/2011 |

* cited by examiner

[FIG. 1]
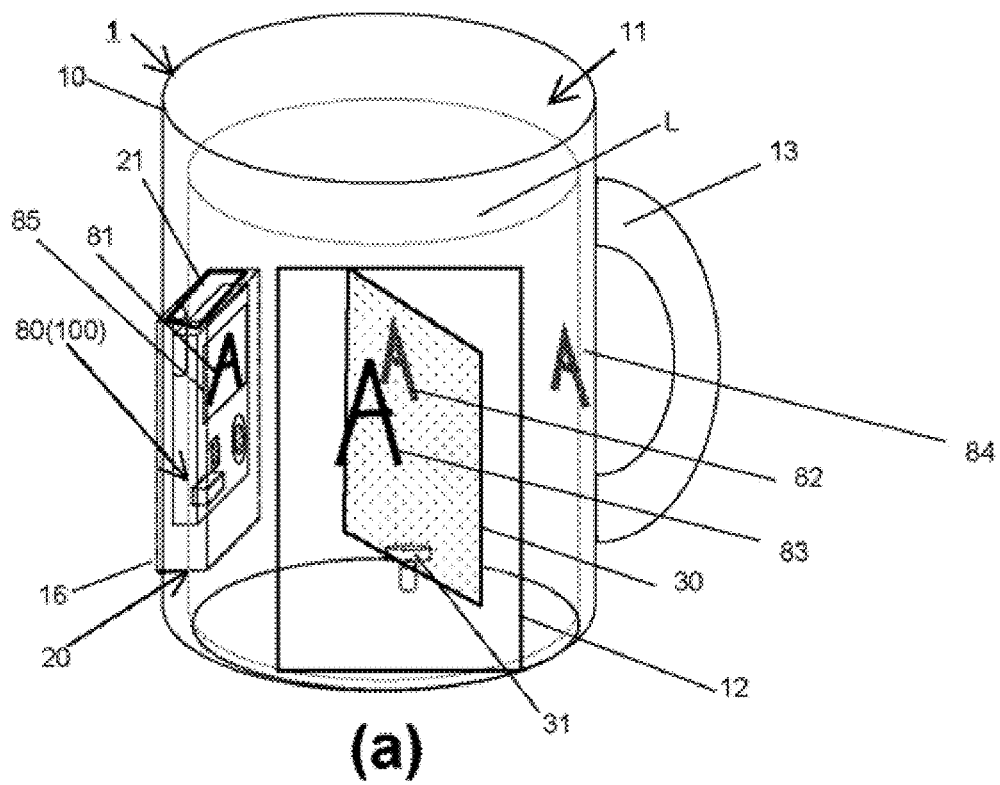
(a)
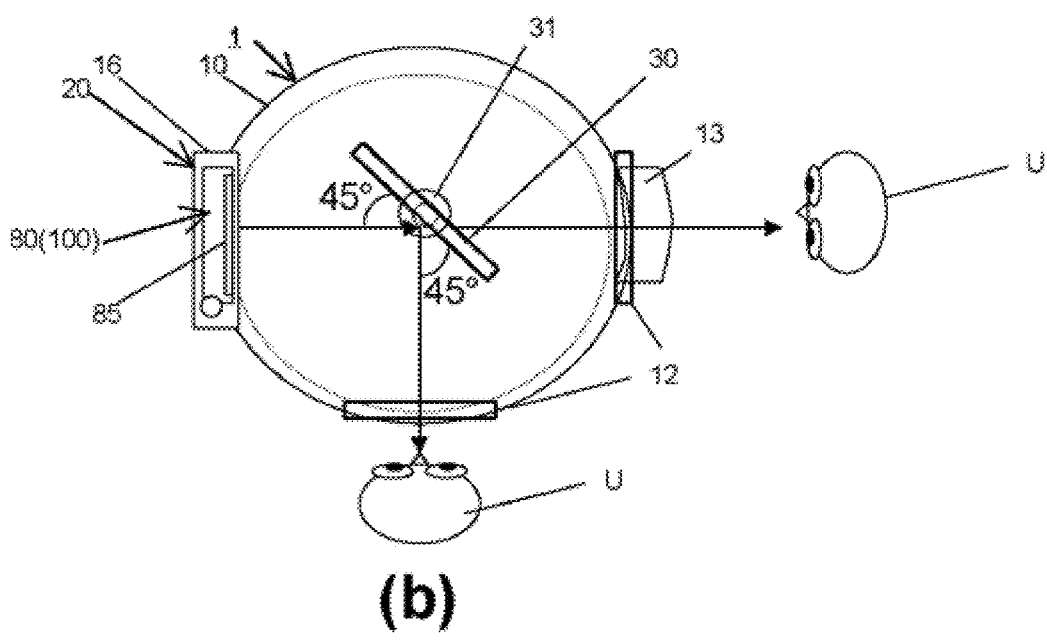
(b)

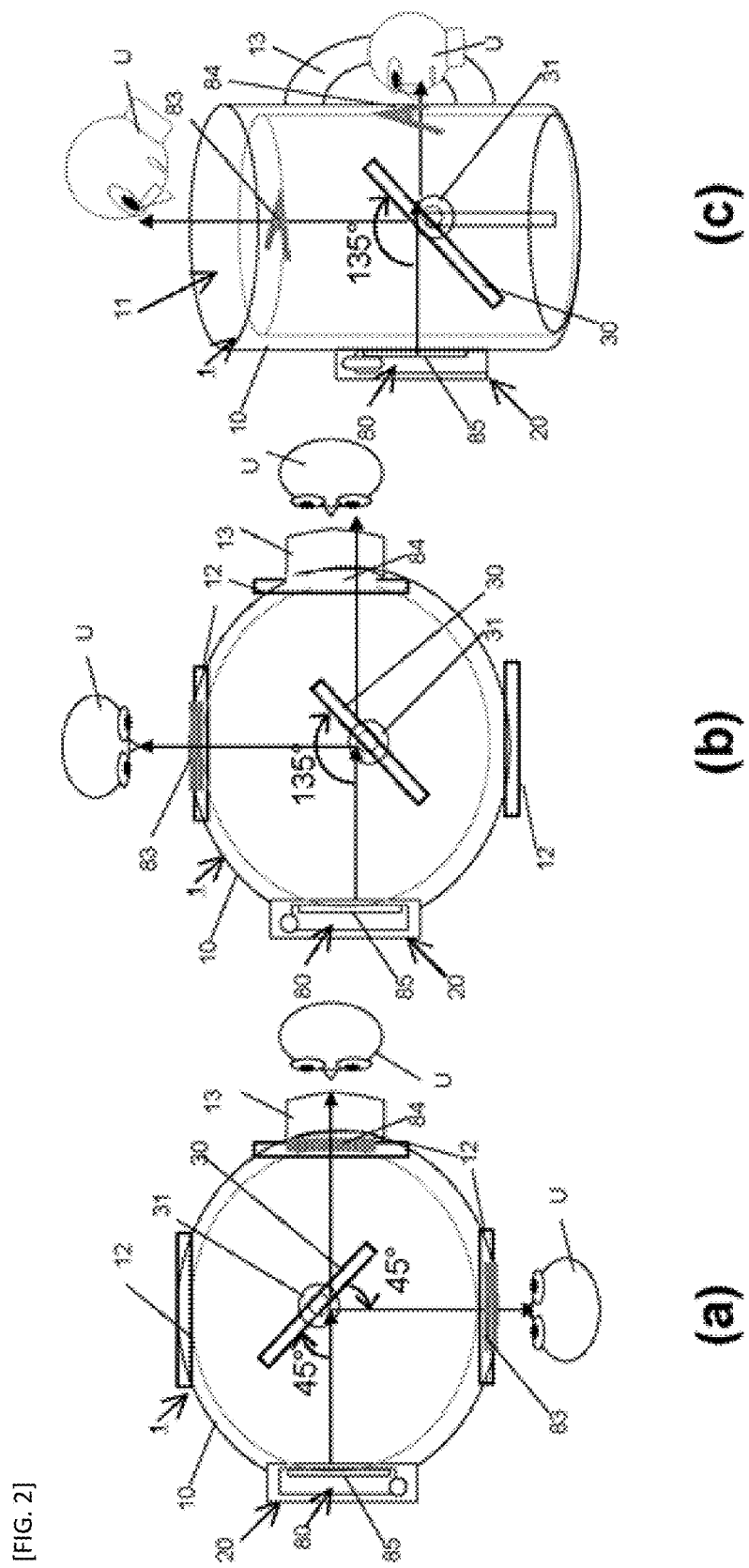
[FIG. 2]

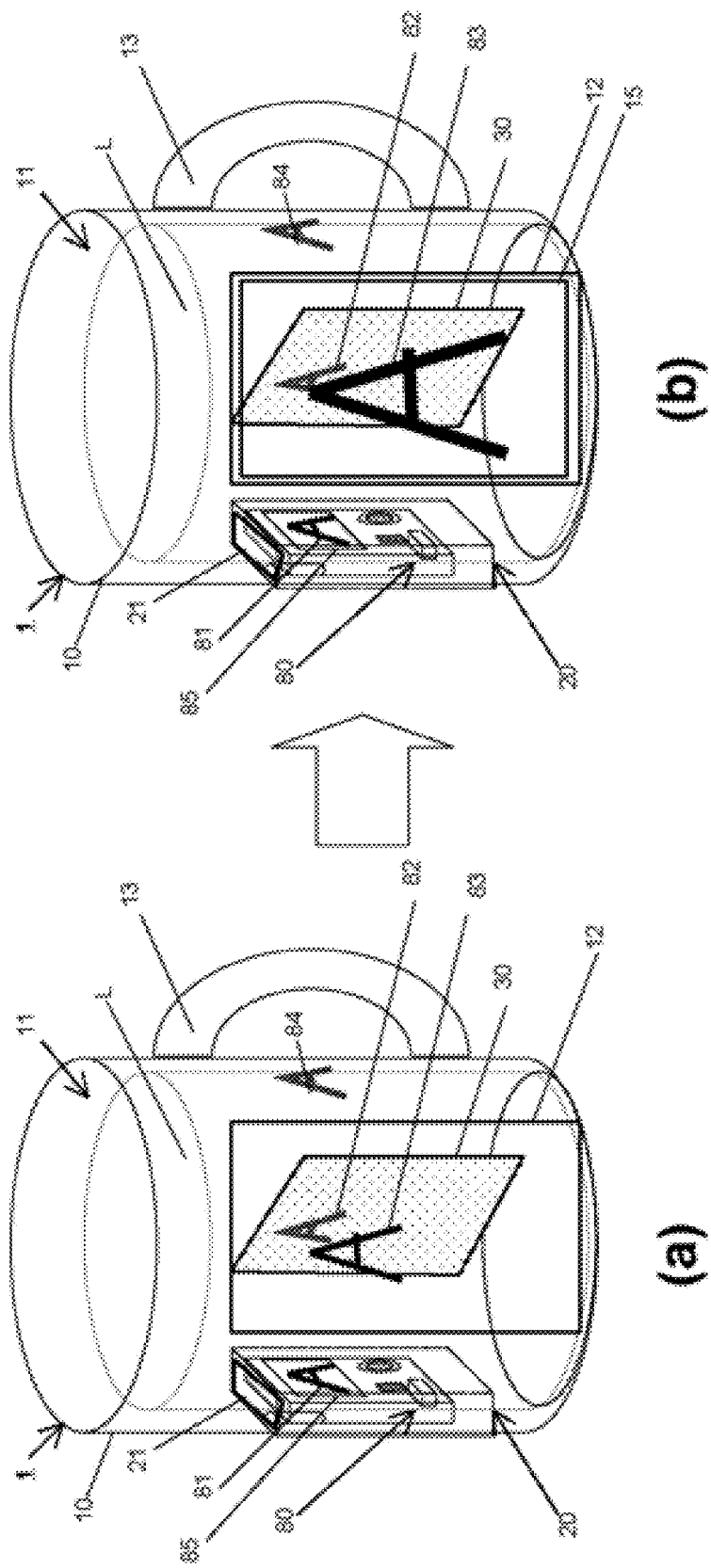

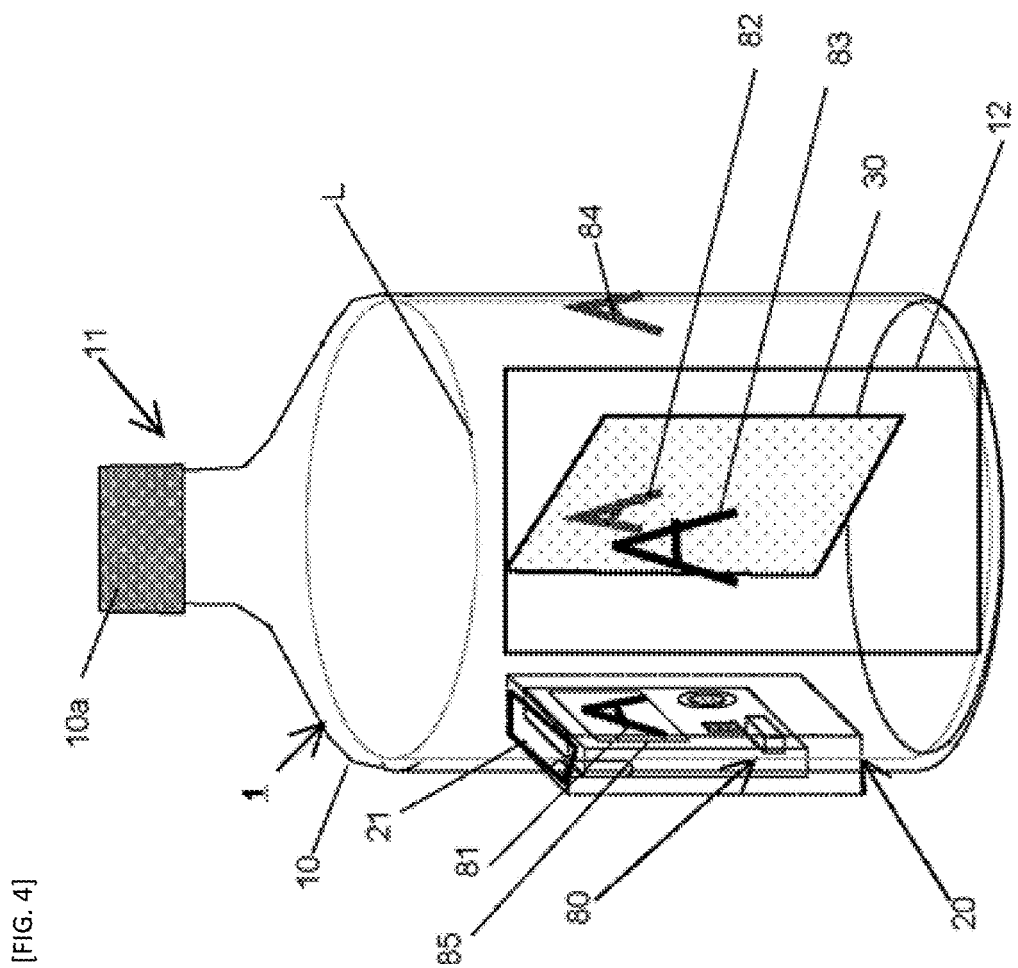

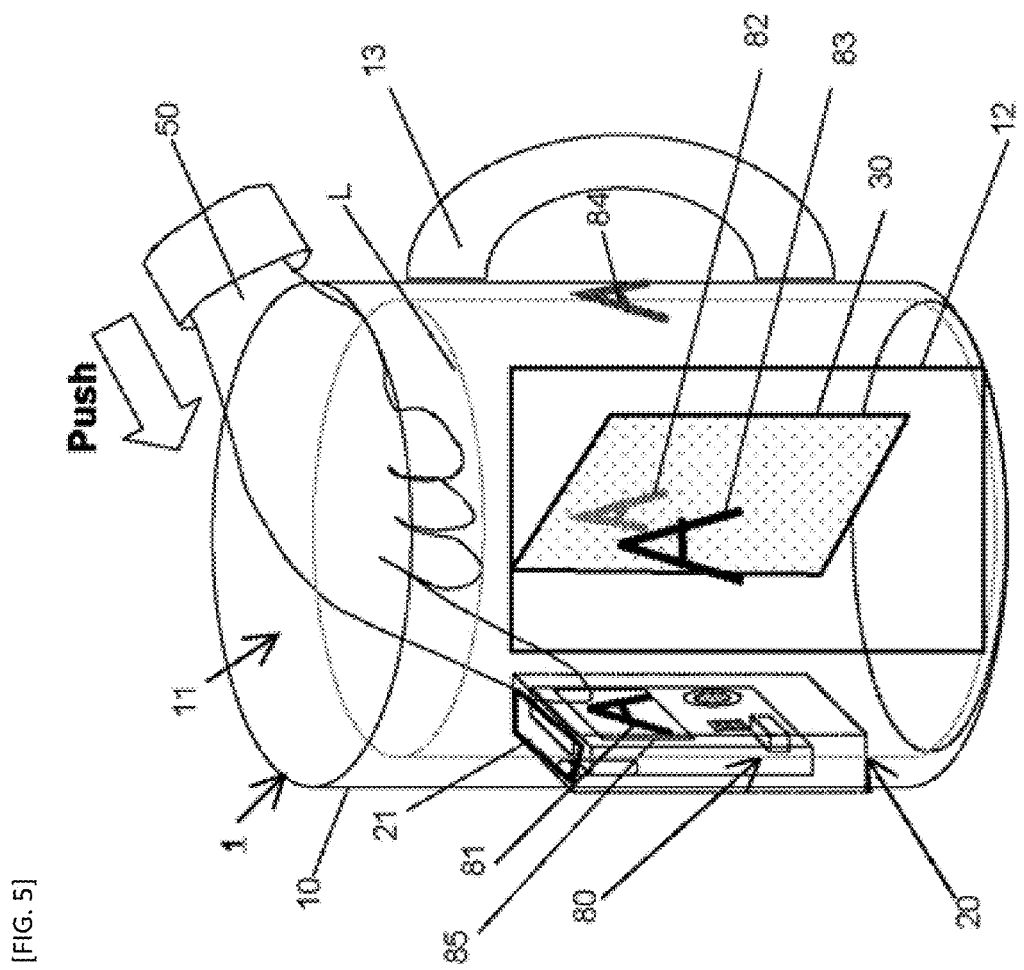

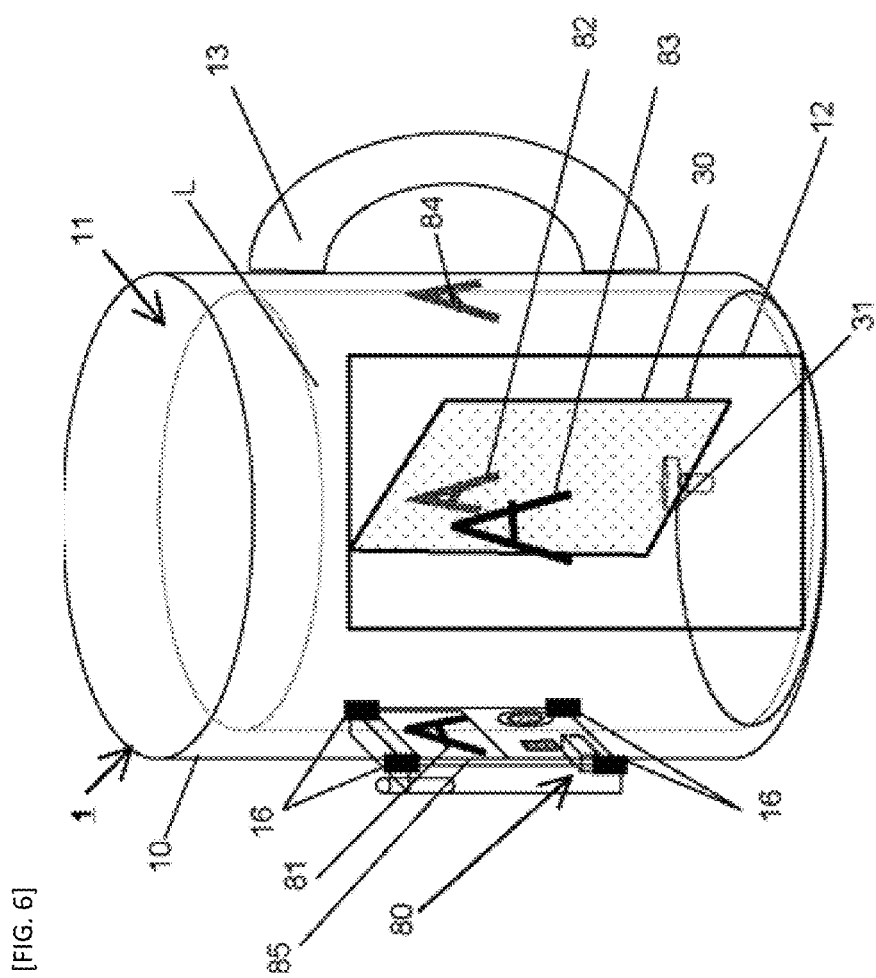
[FIG. 6]

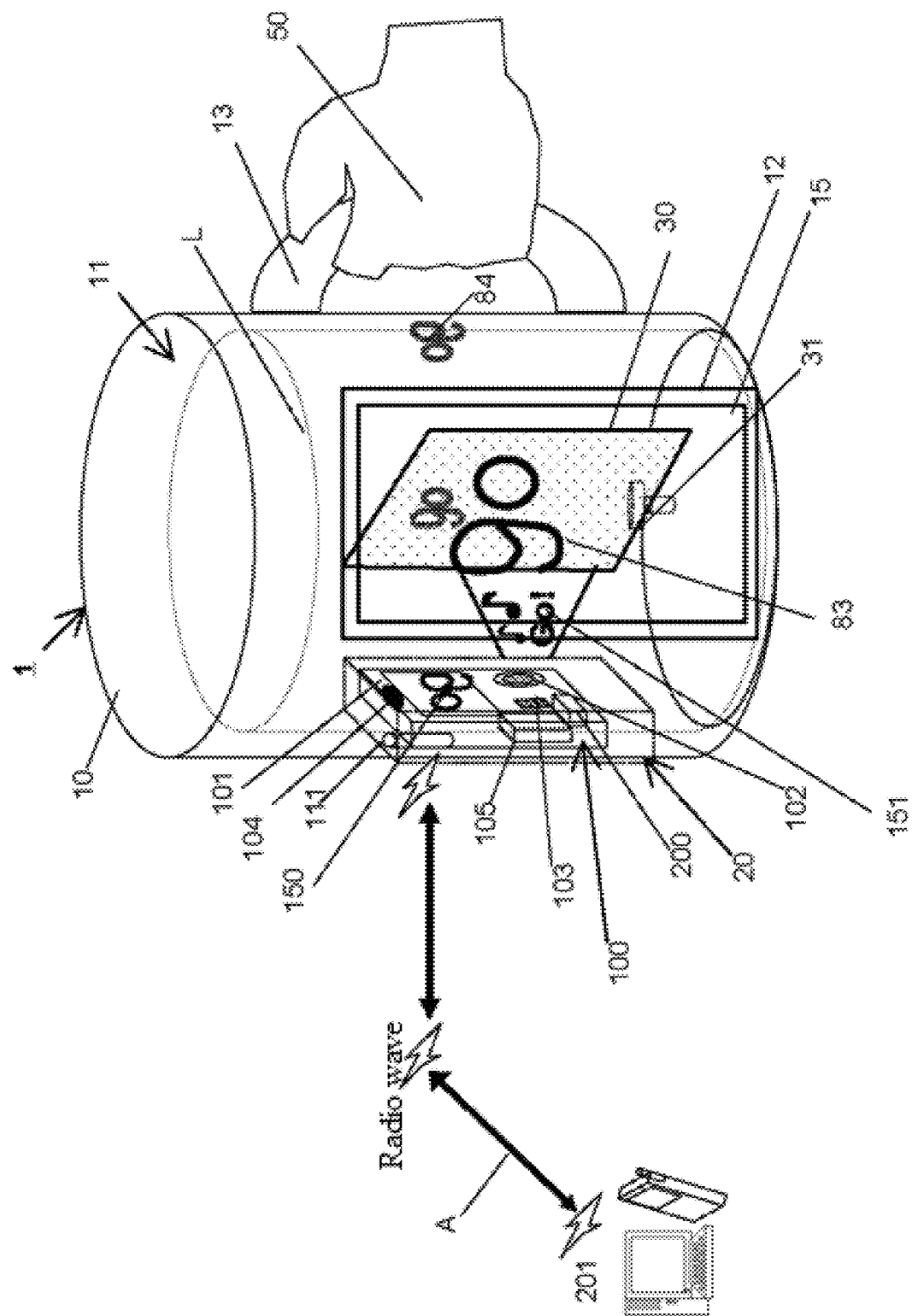
[FIG. 7]

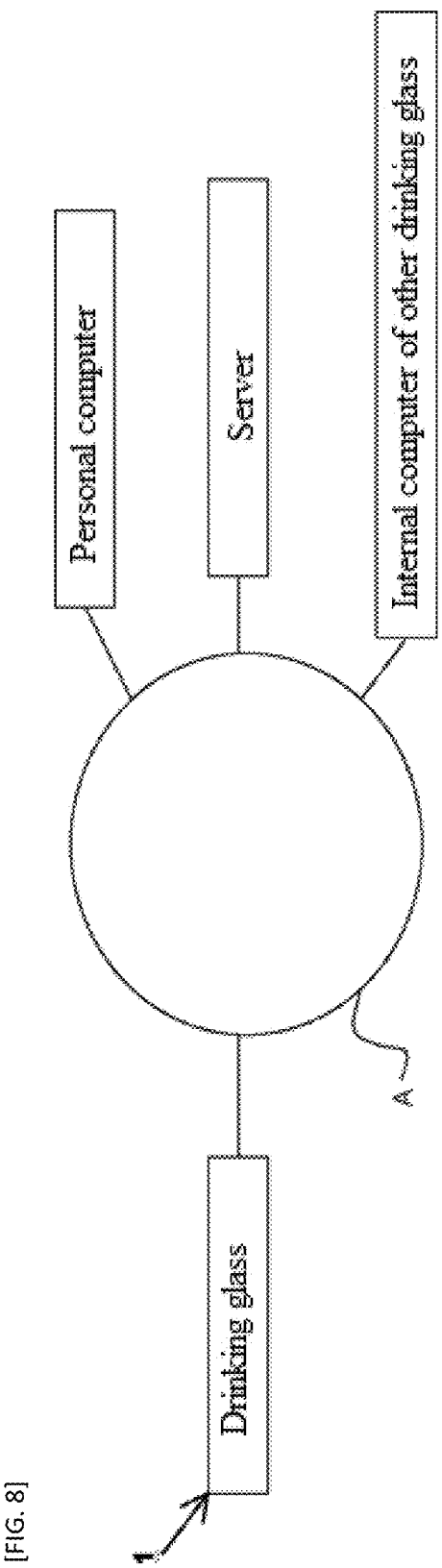

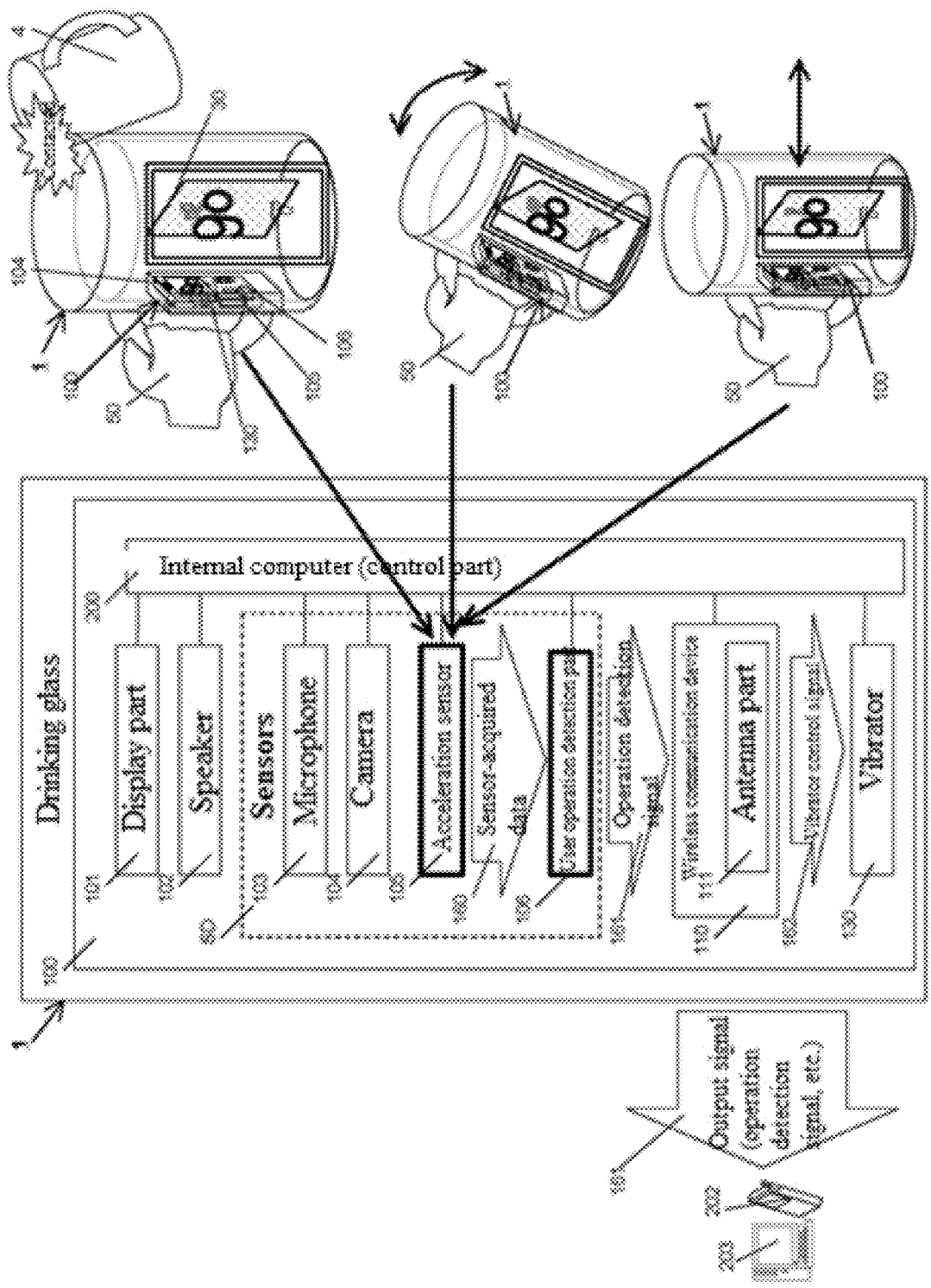

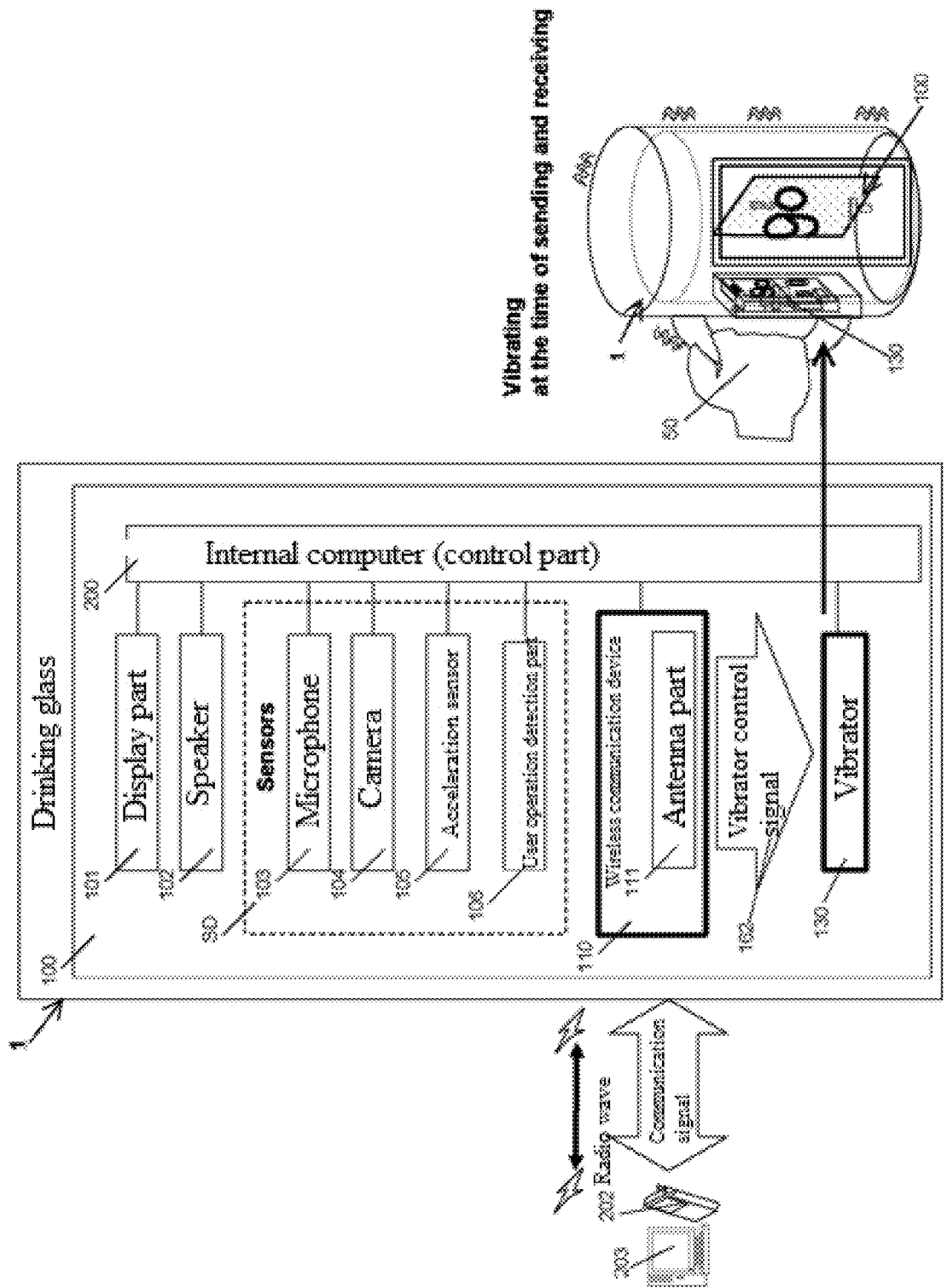
[FIG. 10]

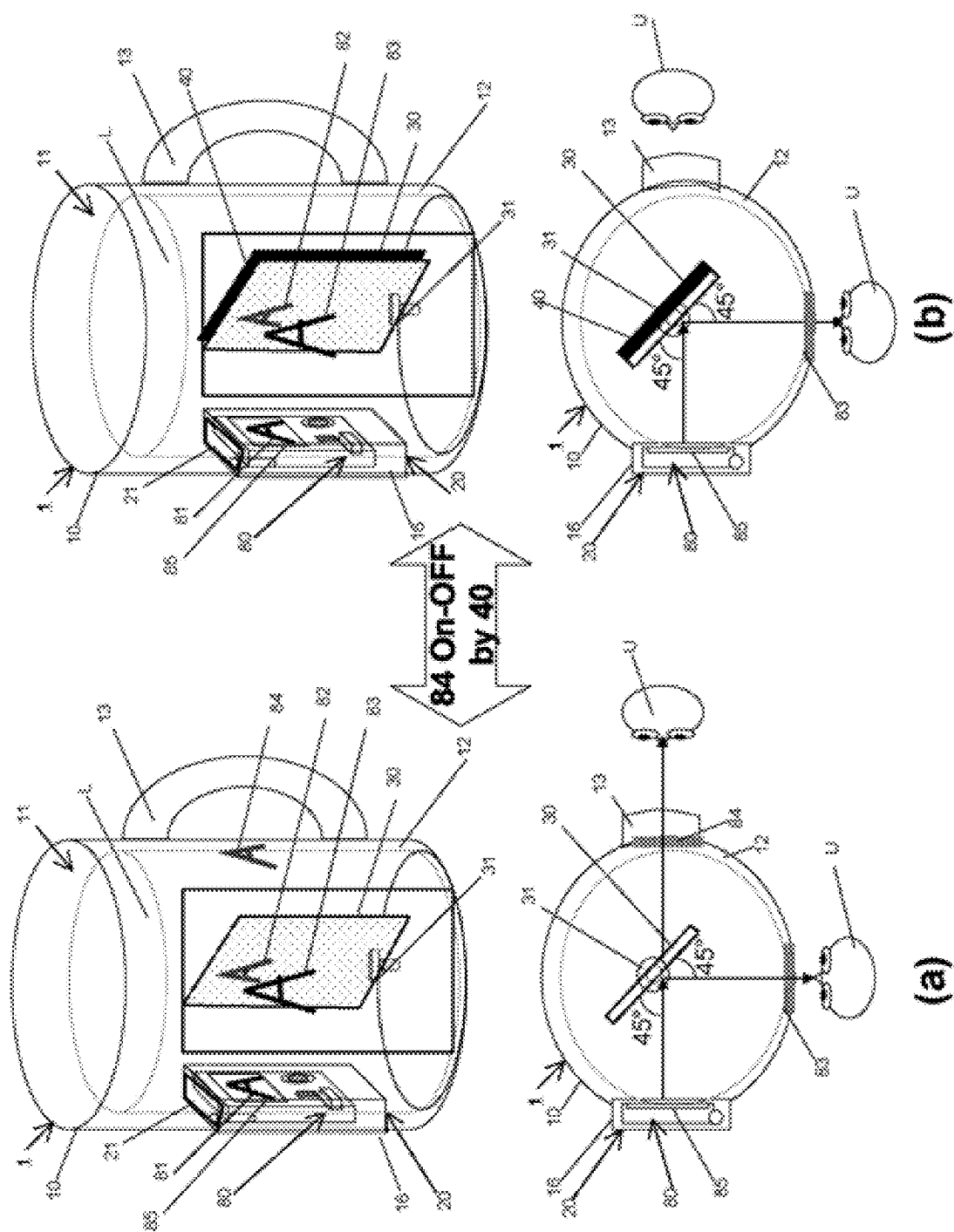

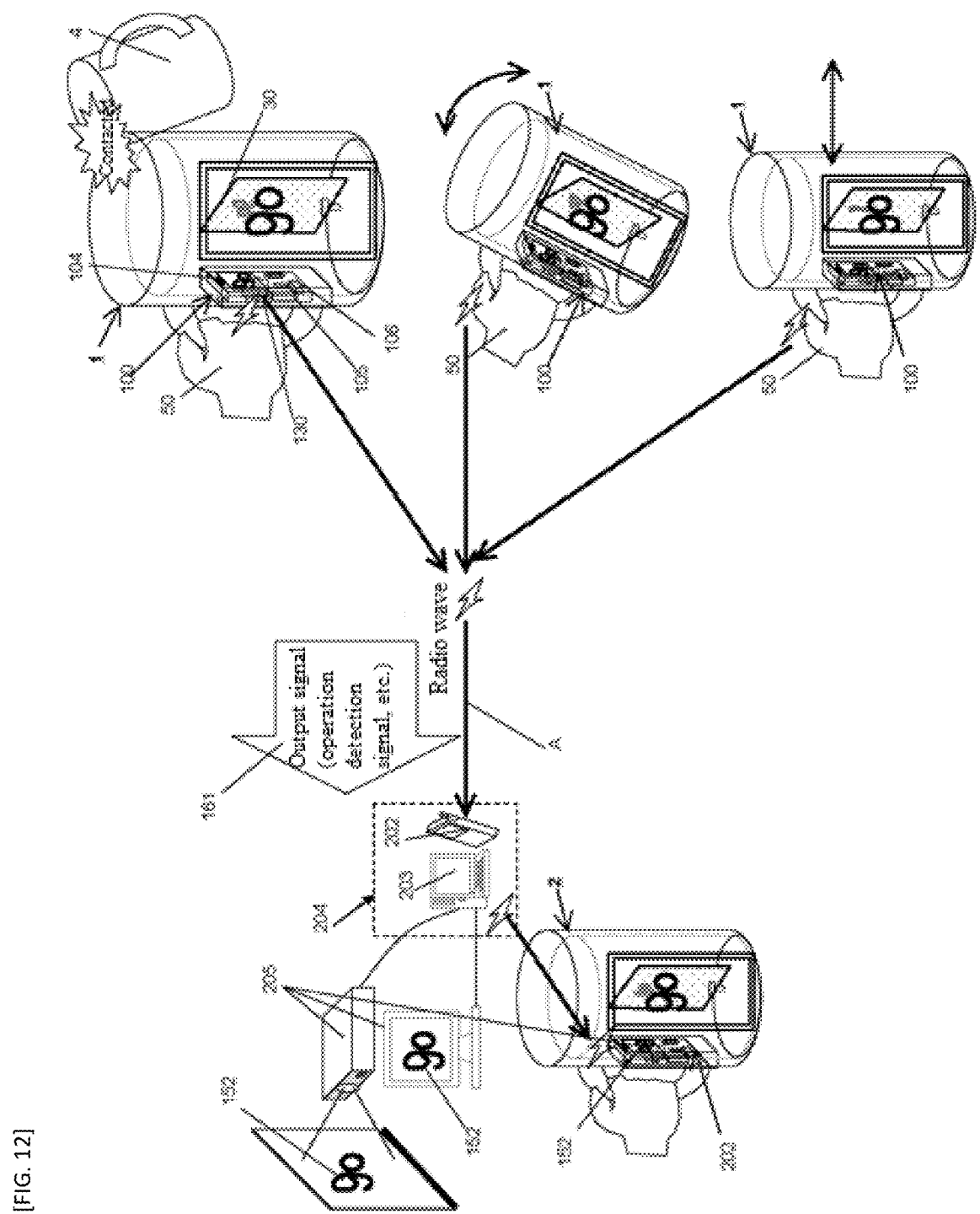
[FIG. 12]

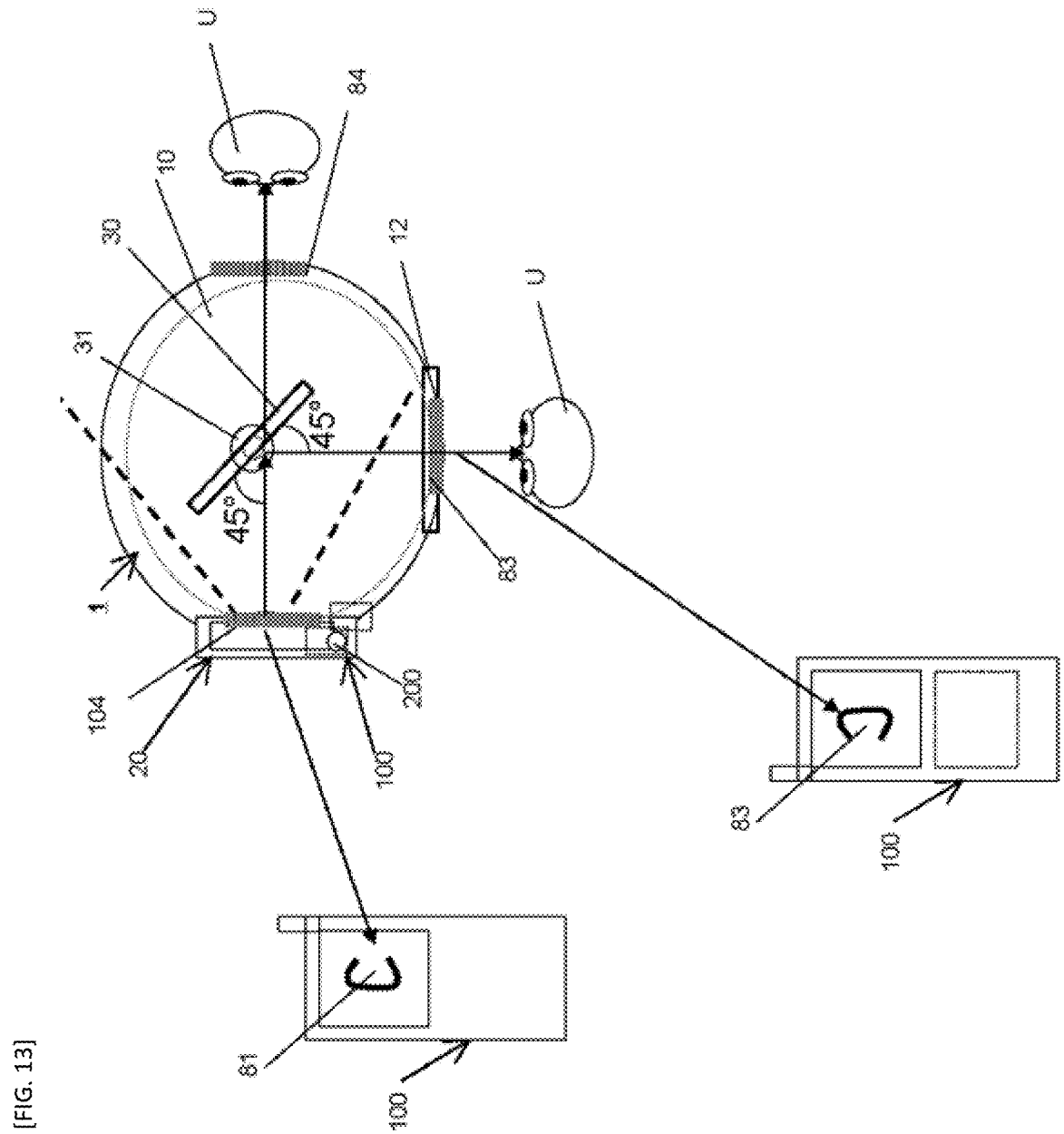
[FIG. 13]

[FIG. 14]
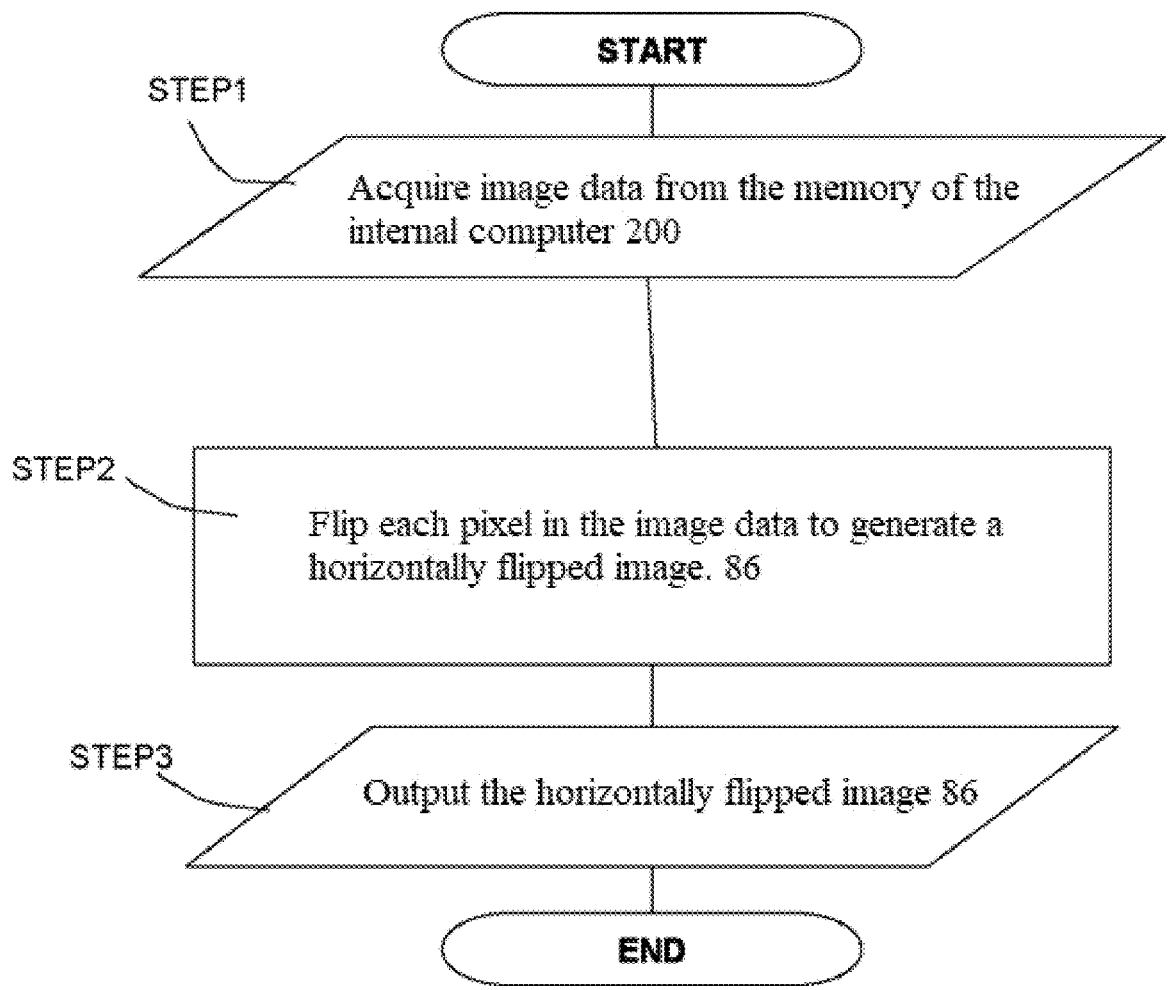

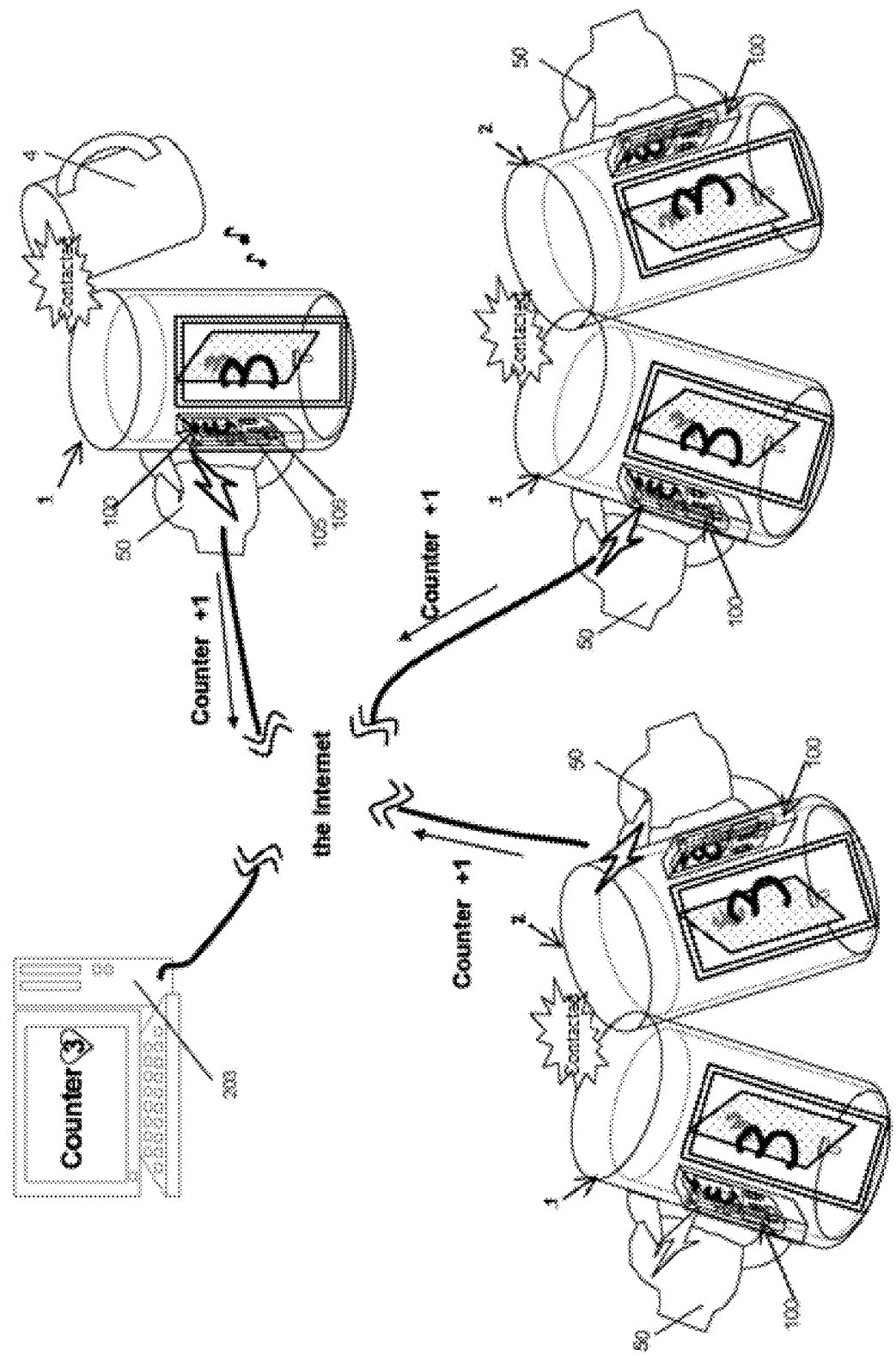
[FIG. 15]

[FIG. 16]
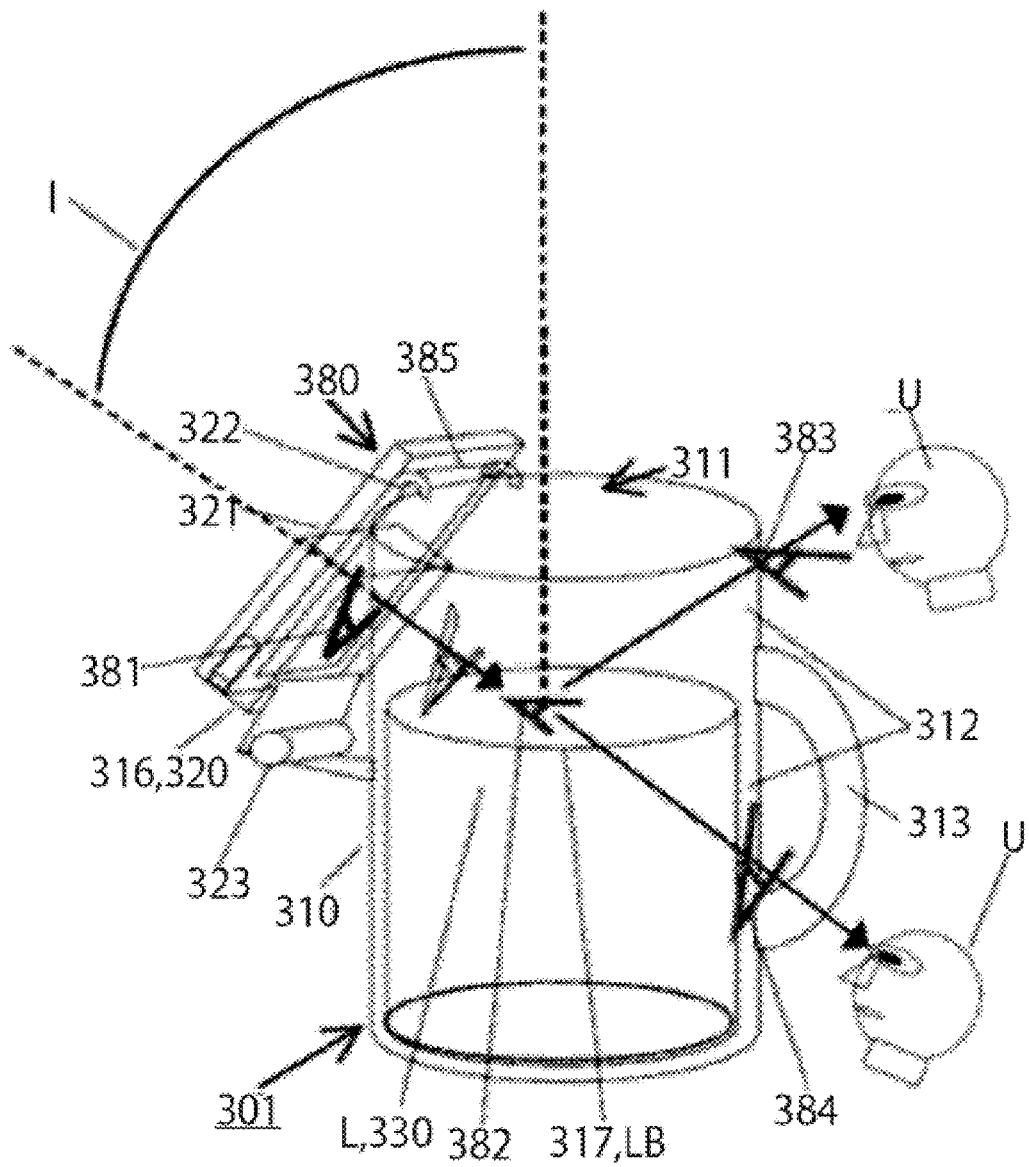

[FIG. 17]
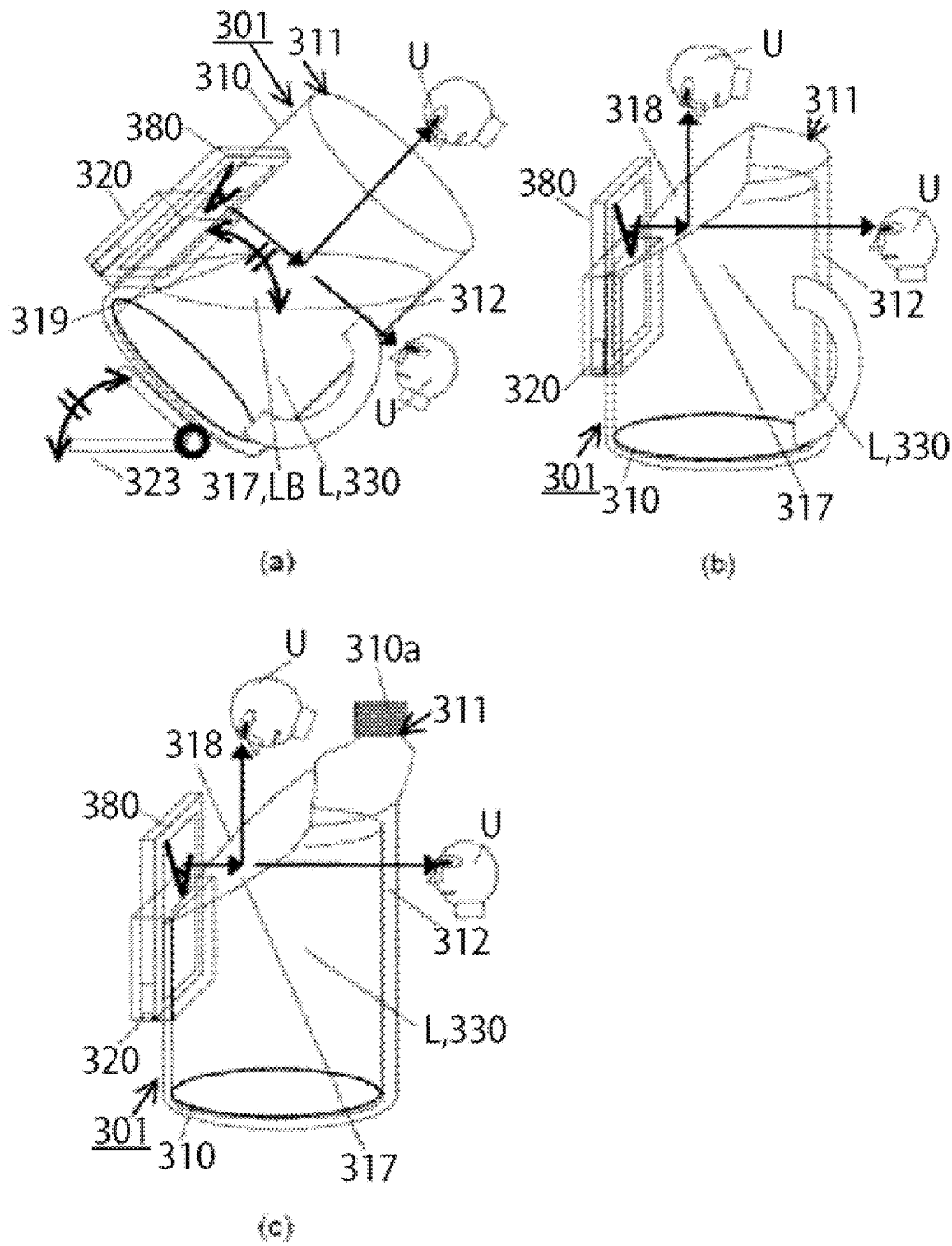
(a)
(b)
(c)

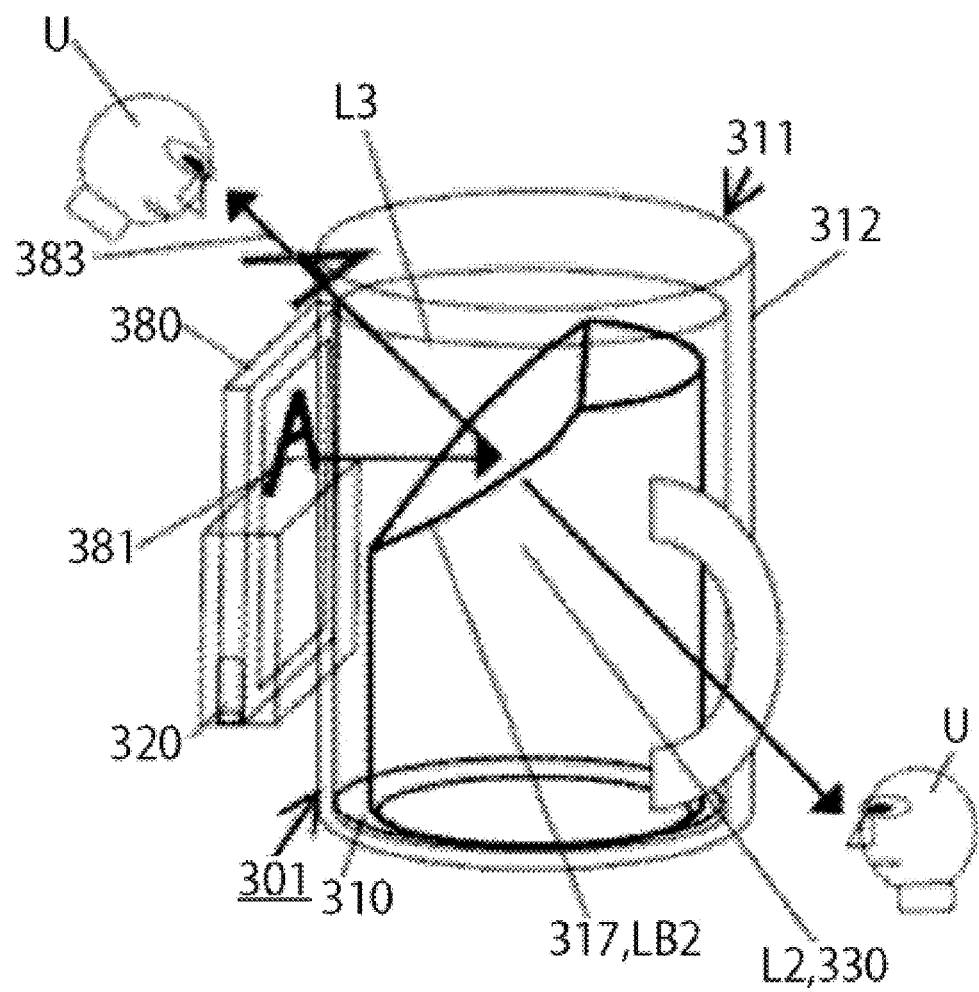
[FIG. 18]

[FIG. 19]
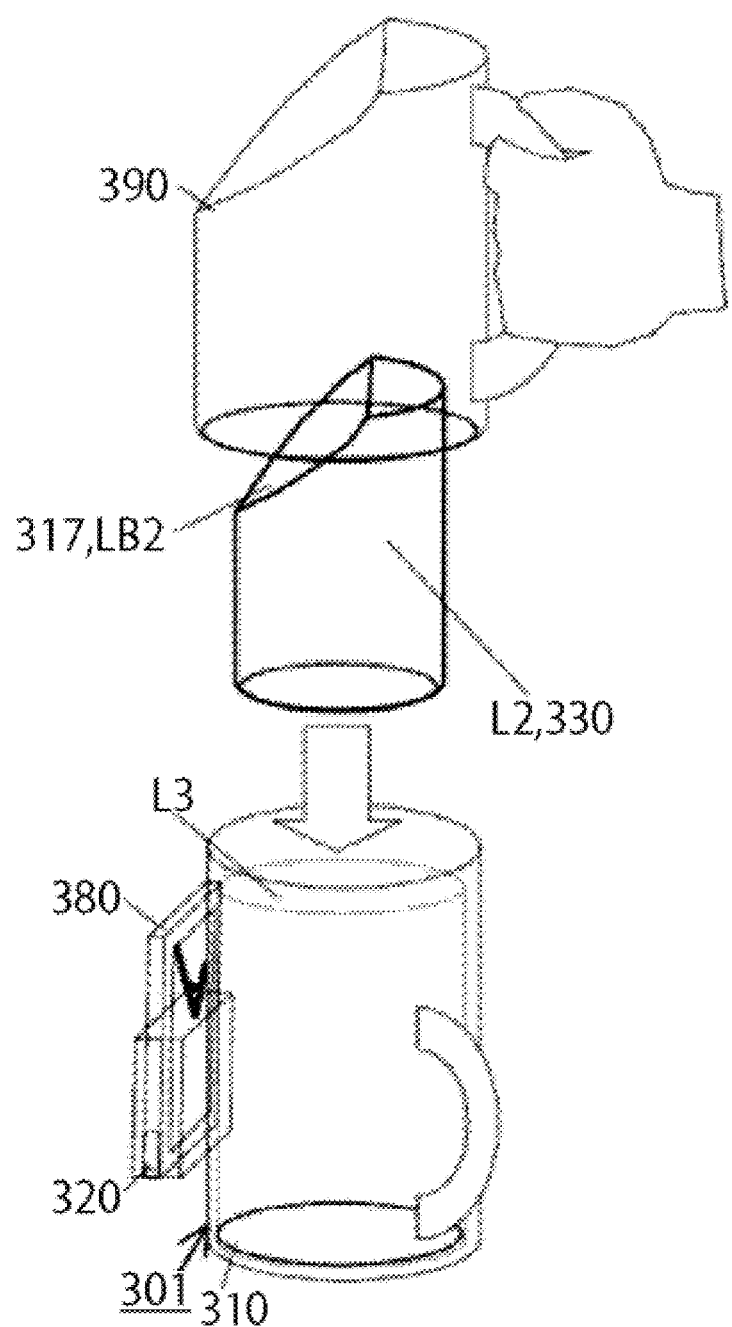

[FIG. 20]
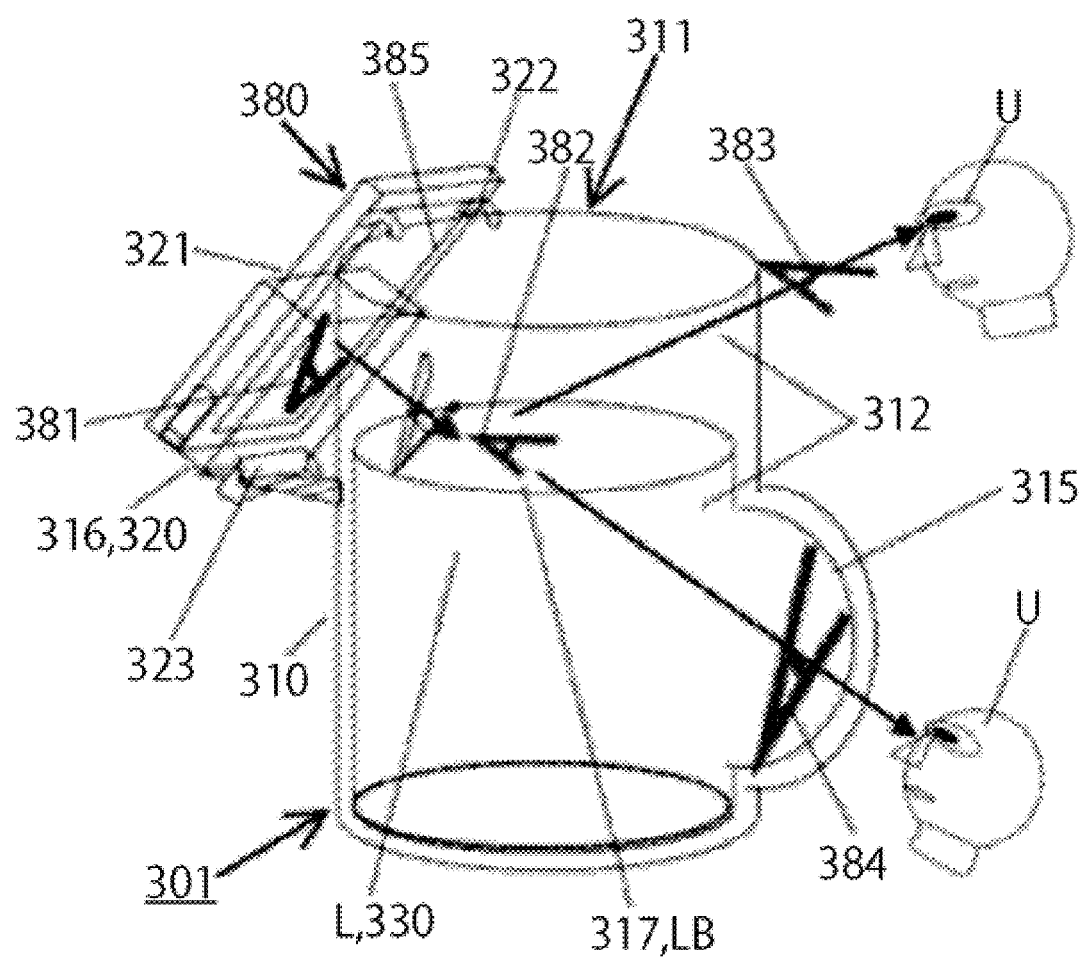

[FIG. 21]
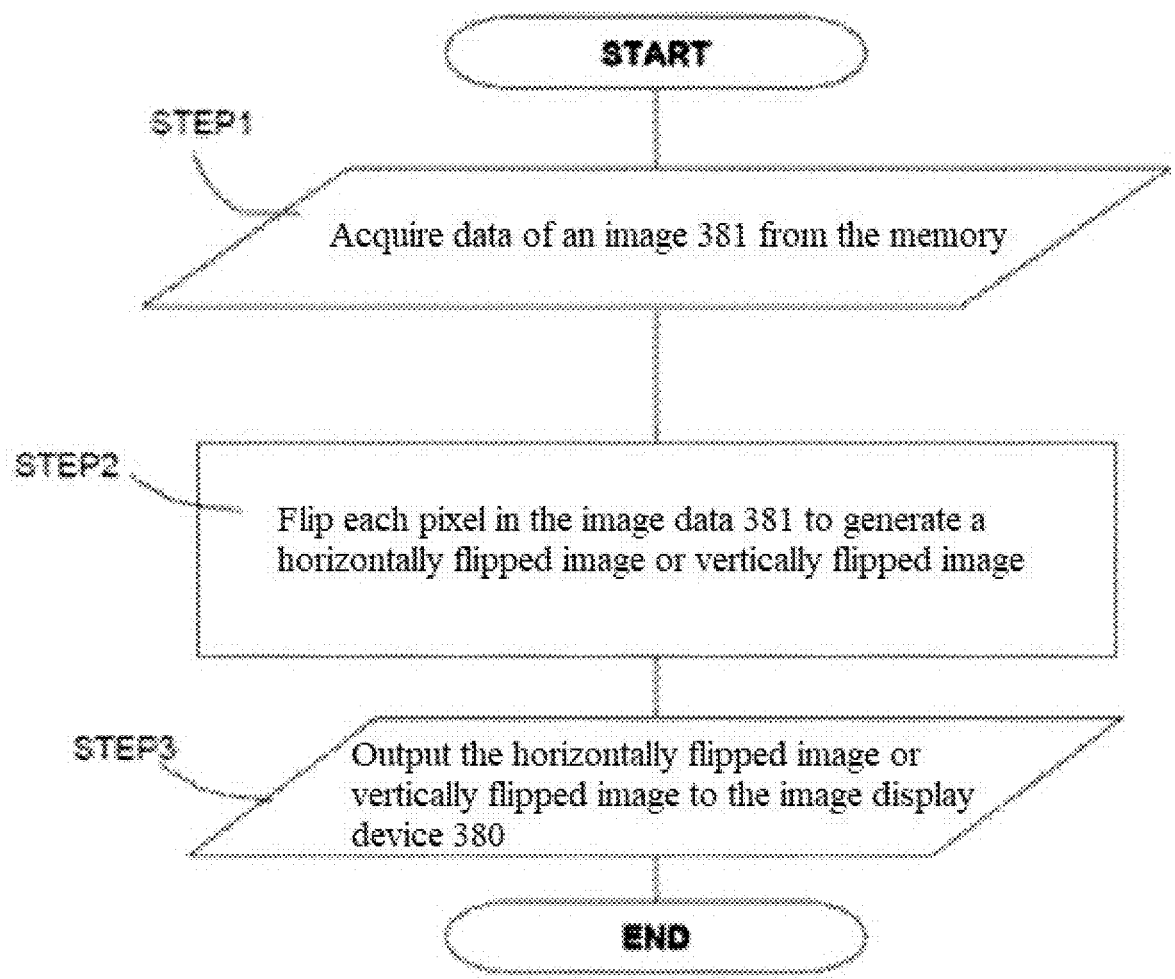

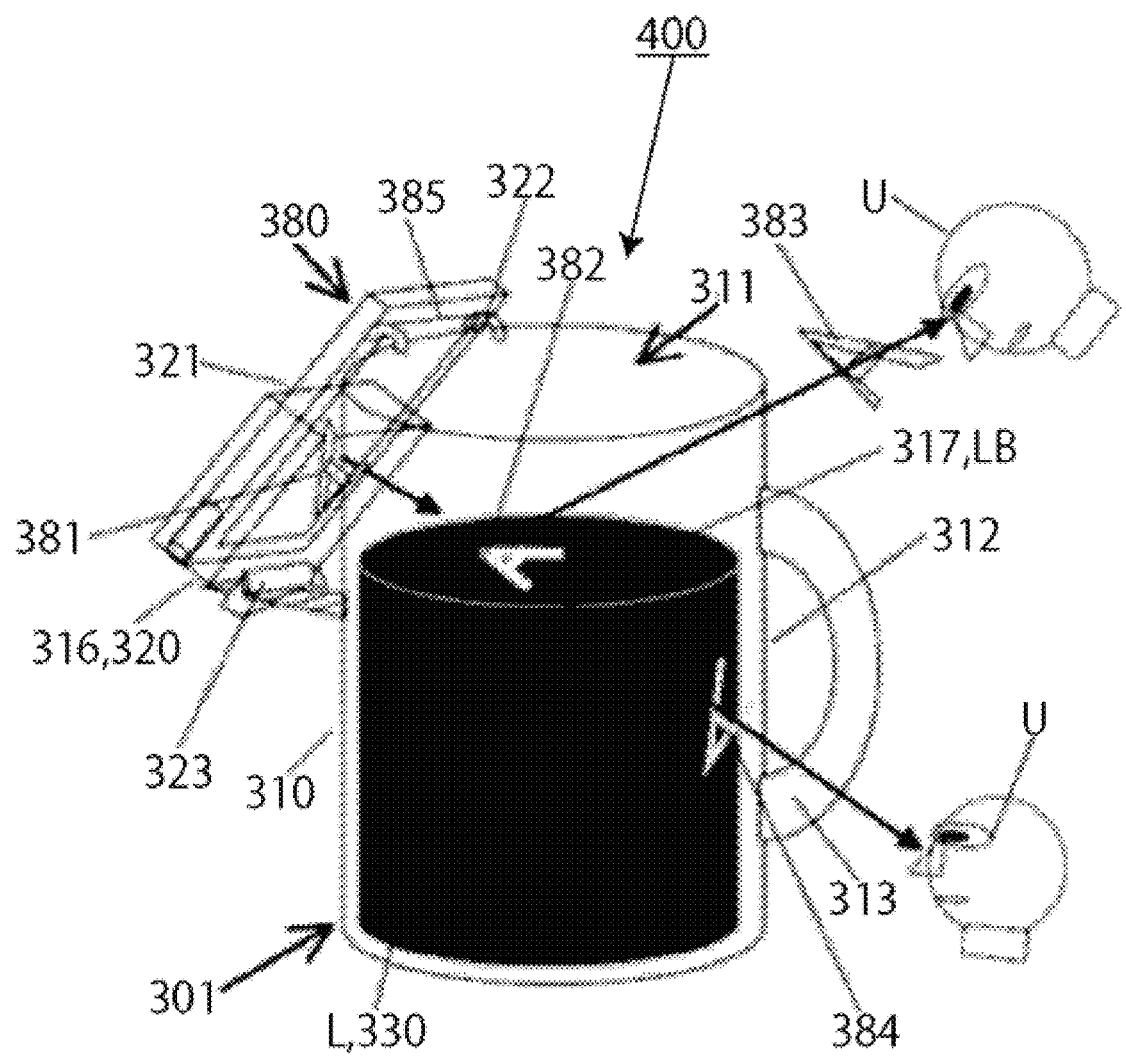
[FIG. 22]

DRINKING DRAMATIZATION GLASS, DRINKING DRAMATIZATION SYSTEM, REMOTE TOAST COUNTER SYSTEM, STORAGE MEDIUM AND DRINK FREEZE CONTAINER

CROSS-REFERENCE TO RELATED APPLICATIONS

This application is the U.S. National Phase under 35 U.S.C. § 371 of International Application PCT/JP2019/048539, filed Dec. 11, 2019, which claims priority to Japanese Patent Application Nos. JP2018-234173, filed Dec. 14, 2018 and JP 2019-164942, filed Aug. 23, 2019. The International Application was published under PCT Article 21(2) in a language other than English.

CROSS-REFERENCE TO RELATED APPLICATIONS

This application is the U.S. National Phase under 35 U.S.C. § 371 of International Application PCT/JP2019/048539, filed Dec. 11, 2019, which claims priority to Japanese Patent Application Nos. JP2018-234173, filed Dec. 14, 2018 and JP 2019-164942, filed Aug. 23, 2019. The International Application was published under PCT Article 21(2) in a language other than English.

TECHNICAL FIELD

The present invention relates to a drinking dramatization glass that lets an individual enjoy oneself together with others in remote locations and presents many different dramatizing effects. Additionally, it relates to a drinking dramatization glass that allows an image display device to be fixed with ease on the glass body and the orientation of an image display part of the image display device to be changed with ease, and further allows multiple people to view an image at the same time. Additionally, it relates to a drinking dramatization system and a remote toast counter system, both using such drinking dramatization glasses, as well as a storage medium for use therewith. Additionally, it relates to a drinking dramatization glass and a drinking dramatization system, both designed to use a beam splitter constituted by drinking water to spectrally disperse or reflect an image from the image display device on the side face of the glass, as well as a storage medium and a drink freeze container, both for use with such drinking dramatization glass and drinking dramatization system.

BACKGROUND ART

At parties, receptions, and other events, oftentimes the participants toast by clinking their glasses containing drinks, to share their joy with one another.

In the past, glasses have been developed that offer various functions in addition to containing drinks.

For example, Patent Literatures 1 and 2 disclose an art of using a sensor to detect that a glass has been raised, and then outputting various sounds from a speaker provided in the lower part of the glass.

Patent Literature 3 discloses an art, pertaining to a glass equipped with a means for detecting its tilt angle, of producing voices according to the tilt angle of the glass.

Patent Literature 4 discloses an art of placing a light-emitting piece in an intermediate layer between the interior wall and the exterior wall of a glass, with the light-emitting piece emitting light when the glass is shaken.

Patent Literatures 5 and 6 disclose an art of placing a display device on the surface of a glass and allowing the image displayed on the display device to be changed manually or according to the output of a motion sensor that detects the state of the glass.

Patent Literature 7 discloses an art of placing a display device on the surface of a glass, while placing a control module and connection terminals in a space at the bottom of the glass. By hardwiring it to an external computer via the connection terminals, the control module can download multiple types of image data and display them on the display device.

Patent Literatures 8 to 10 disclose a drinking dramatization glass invented by the inventor of the invention under the present application for patent. This drinking dramatization glass comprises: a glass body; a storage part extending from the bottom part, toward the interior side, of the glass body and used for storing a mobile communication device; and a waveguide part extending from the side face, toward the interior side, of the glass body and used for letting the radio waves from the mobile communication device pass through. This drinking dramatization glass can let the radio waves from the mobile communication device pass through to the exterior to enable wireless communication, even when a drink is filled inside the glass body.

Patent Literatures 11 and 12 disclose a drinking dramatization glass invented by the inventor of the invention under the present application for patent. This drinking dramatization glass comprises an image display device fixed on the side face of the glass using the storage part, and a reflective mirror or half mirror placed inside the glass body, and the glass allows for dramatization based on pseudo-projection of the image from the image display device onto the interior of the glass.

BACKGROUND ART LITERATURE

Patent Literature

Patent Literature 1: Japanese Utility Model Laid-open No. Sho 62-92769
Patent Literature 2: Japanese Patent Laid-open No. Hei 3-45213
Patent Literature 3: Japanese Utility Model Laid-open No. Hei 1-81970
Patent Literature 4: Japanese Utility Model Registration No. 3086140
Patent Literature 5: Japanese Patent Laid-open No. 2005-99159
Patent Literature 6: U. S. Patent Application Publication No. 2008/0100469, Specification
Patent Literature 7: U.S. patent Ser. No. 08/550,288, Specification
Patent Literature 8: Japanese Patent No. 6337256
Patent Literature 9: Japanese Patent No. 6406742
Patent Literature 10: Japanese Patent No. 6432960
Patent Literature 11: Japanese Patent No. 6488049
Patent Literature 12: Japanese Patent No. 6528162

SUMMARY OF THE INVENTION

Problems to be Solved by the Invention

However, Patent Literatures 1 to 6 mentioned above involve outputting voices, images, etc., that have been pre-recorded in a memory, etc., or causing a light-emitting piece to emit light, which presents a problem of lack of variations in, and limitations of, dramatizing effects.

Patent Literature 7 requires hardwire connection with an external computer via the connection terminals, which presents a problem of cumbersome operations, as well as a problem of malfunction if the connection terminals get wet.

Also, Patent Literatures 1 to 7 cater to the enjoyment of only the people in the sole space where the glass is placed, which presents a problem that they cannot share their joy with others in remote locations.

Also, Patent Literature 8 has a storage part and a waveguide part provided inside the glass body, which presents a problem that the capacity of the glass body will decrease, as well as a problem that the manufacturing steps will increase. Additionally, because the insertion opening of the storage part is located at the bottom part of the glass body, the glass body must be lifted when the mobile communication device is inserted or removed through this insertion opening, which presents a problem of difficulty answering an unexpected incoming call. Also, the mobile communication device in the glass body has a fixed orientation, which presents a problem that the orientation of the image display part cannot be changed, as well as a problem of difficulty creating a simultaneous viewing experience among multiple people.

Also, Patent Literatures 11 and 12 mentioned above pose a risk of damage to the metal or glass reflective mirror or beam splitter (spectroscope) placed in the glass when ice is dropped into the glass or the drink in the glass is stirred with a spoon, etc., which in turn presents a safety issue that the user may accidentally swallow the broken pieces of the damaged reflective mirror or beam splitter. Another problem is that the weight of the glass itself will increase by the weight of the reflective mirror or beam splitter. Also, a problem arises in that the user will have difficulty controlling or fine-tuning the image reflectivity and transmissivity by himself/herself.

In light of the aforementioned problems, an object of the present invention is to provide a drinking dramatization glass that lets an individual enjoy oneself together with others in remote locations, and presents many different dramatizing effects. Another object to provide a drinking dramatization glass that allows an image display device to be fixed with ease on the glass body and the orientation of an image display part of the image display device to be changed with ease, and further allows multiple people to view an image at the same time. Yet another object is to provide a drinking dramatization system and a remote toast counter system, both using such drinking dramatization glasses, as well as a storage medium for use therewith. Yet another object is to provide a drinking dramatization glass which is safe and permits easy control of image reflectivity, a drinking dramatization system using such drinking dramatization glass, as well as a storage medium and a drink freeze container, both for use with such drinking dramatization glass and drinking dramatization system.

Means for Solving the Problems

The drinking dramatization glass proposed by the present invention comprises: a glass body being a bottomed cylinder with a top opening; a fixing mechanism for fixing an image display device on the side face of the glass body; a transparent part for viewing, from the exterior of the glass body, an image displayed on an image display part of the image display device; and a beam splitter placed inside the glass body; which is characterized in that the image displayed on the image display part is spectrally dispersed into two images—a reflected image and a transmitted image—by the beam splitter, and the reflected image and transmitted image pass through the transparent part and reach the exterior of the glass body.

Also, it is characterized in that the image display device is a part of a mobile communication device.

Also, it is characterized in that a part or all of the transparent part constitutes a lens so that the image display part can be magnified for viewing from the exterior of the glass body.

Also, it is characterized in that the orientation of the beam splitter can be changed in the horizontal direction and/or the vertical direction.

Also, it is characterized in that the beam splitter has a detachable light-blocking layer and, when the light-blocking layer is attached to the beam splitter, the beam splitter can be utilized as a reflective mirror.

Also, it is characterized in that the glass body has a transparent handle.

Also, it is characterized in that the fixing mechanism comprises an insertion opening through which to insert the image display device, and a storage part for storing the image display device, and the storage part is made of a flexible material so that, by applying an external force, the storage part can be deformed to operate the image display device in the storage part.

Also, it is characterized in that it has a lid for closing off the top opening.

Also, it is characterized in that the image display device is a part of a mobile communication device, the mobile communication device has a user operation detection part and an acceleration sensor, and the user operation detection part detects, based on output data from the acceleration sensor, whether the user has moved or tilted the glass body or clinked it against other object (hereinafter referred to as "user operation") and transmits an output signal to the exterior.

Also, it is characterized in that the image display device is a part of a mobile communication device, the mobile communication device has a vibrator, and the vibrator vibrates at the timing of communication performed by the mobile communication device via radio waves, thereby causing the glass body to vibrate.

Also, it is characterized in that the mobile communication device has a camera, and the camera captures an image at the timing of detection of the user operation by the user operation detection part and transmits the captured image data to the exterior.

Also, it is characterized in that the beam splitter is constituted by a drink inside the glass body, and the drink has, at the position of incidence of the image, an inclined plane that is flat and inclines with respect to the image display part.

Also, it is characterized in that the ratio of brightness between the reflected image and the transmitted image can be adjusted by adjusting the color and/or optical transparency of the drink.

Also, it is characterized in that the beam splitter is constituted by a drink that has been frozen into a shape having the inclined plane.

Also, it is characterized in that it has a flat part that inclines with respect to the image display part, at the position of incidence of the image on the side face of the glass body.

Also, it is characterized in that the angle of inclination of the inclined plane with respect to the image display part is variable.

Also, it is characterized in that it has a curved part that curves convexly toward the outer side of the glass body, at the position of the transparent part where the transmitted image passes through.

Also, it is characterized in that it has a lid for closing off the top opening.

The drinking dramatization system proposed by the present invention comprises the aforementioned drinking dramatization glass, an external computer, and an exterior image display device; which is characterized in that the exterior computer, upon receiving the output signal, generates prescribed image data and transmits it to the external image display device, and the external image display device displays the image data as image content.

Also, it is characterized in that the drink with a color is used as the beam splitter to emphasize a specific color in the reflected image.

The remote toast counter system proposed by the present invention comprises the aforementioned drinking dramatization glass, and an external server computer; which is characterized in that the external server computer receives the output signal, counts the number of times the signal has been received, and records the result as a cumulative number of toasting operations, so that the user can view the cumulative number of toasting operations.

The storage medium proposed by the present invention is a storage medium in which a computer program for use with the aforementioned drinking dramatization glass is saved; which is characterized in that the computer program horizontally flips the image.

Also, it is a storage medium in which a computer program for use with the aforementioned drinking dramatization glass is saved; which is characterized in that the computer program horizontally flips and/or vertically flips the image.

The drink freeze container proposed by the present invention is a drink freeze container for use with the aforementioned drinking dramatization glass; which is characterized in that it freezes a drink into a shape having the inclined plane.

Effects of the Invention

Skin depth is an indicator of the level of attenuation of the amplitude (strength) of a radio wave as determined by solving a wave motion equation derived from Maxwell's equation of electromagnetism, and represents a distance in which an electromagnetic field (radio wave) incident to a material attenuates to a strength of $1/e$ ($\approx 1/2.718 \approx 37$ [%]) ($e$ is a natural logarithm).

Assuming that a radio wave with a frequency of 1 [GHz] is made incident to sea water, which is a representative example of liquid; in this case, a skin depth of 7.9 [mm] is obtained. This means that the distance in which the amplitude (strength) of the radio wave incident to sea water attenuates to $1/e$ ($\approx 37$ [%]) is 7.9 [mm], and that, when a radio wave of 1 [GHz] (frequency ranges currently used by mobile phones in Japan are approx. 800 [MHz] to 3 [GHz]) is made incident to sea water in a glass cup, for example, it will attenuate to 37 [%] or less before making its way by no more than 1 [cm] from the surface of the cup. (In reality, it will attenuate more because of attenuation not only due to the sea water, but also due to the glass cup, etc. Also, with sea water taken from the waters with high concentrations of impurities and salt, the levels may far exceed the aforementioned sea water attenuation because of these impurities.) Other liquids, such as thick juices as well as cocktails and other alcoholic drinks made therewith, may contain more impurities than sea water, in which case they will naturally cause greater attenuations compared to sea water.

Also, the higher the frequency of a radio wave, the shorter its skin depth becomes. In recent years, frequencies of 1 [GHz] to 3 [GHz] or even higher are used by high-speed packet communication services, etc., for mobile phones and other mobile communication terminals; however, radio waves of these frequencies as well as 2.4 [GHz], 5 [GHz] (IEEE 802.11n), 60 [GHz] (IEEE 802.11ad) and other Wi-Fi wireless LANs, etc., are subject to much greater attenuation than those of a frequency of 1 [GHz].

As described above, city water, soft drinks, alcoholic drinks and other liquids containing impurities have a property of blocking radio waves, unlike air.

When a liquid is poured in the glass body while the mobile communication device—which is a communication device equipped with an image display part and a voice output part capable of outputting image contents and voice contents, respectively, or specifically a mobile phone, smartphone, PDA, tablet terminal, etc.—is stored inside the glass body, the periphery of the mobile communication device is entirely or partially enclosed by the liquid, and therefore the liquid serves as a blocking material. As a result, problems will arise such as loss of communication function that utilizes radio waves, disabled communication of image data, voice data, etc., and significant lowering of baud rate [bps].

The drinking dramatization glass proposed by the present invention has an image display device fixed on the side face of the glass body, and uses a beam splitter placed in the glass body to spectrally disperse the image on the image display part into a reflected image and a transmitted image. The reflected image and transmitted image pass through two different areas of the transparent part of the glass body and reach the exterior of the glass body to be viewed by multiple users. This has an advantage that multiple people can view an image at the same time. The image display device may be a part of a mobile communication device.

By attaching a light-blocking layer to the beam splitter, the beam splitter can also be utilized as a reflective mirror. This allows for switching between a mode where the transmitted image can be viewed by the user (ON), and a mode where it cannot be viewed by the user (OFF), at any timing as desired by the user.

The drinking dramatization glass proposed by the present invention does not let a drink hinder communication, because the mobile communication device does not follow the convention of being stored inside the glass body, but it is fixed on the side face of the glass body instead. Accordingly, the mobile communication device can receive data from the exterior and output image content at the image display part even when a drink is filled in the glass body.

Also, there is no longer a need, against convention, to provide a storage part or waveguide part inside the glass body, which allows for ensuring of sufficient capacity for the glass body as well as reduction of the manufacturing steps.

When the side face of the glass body is made of an entirely transparent material, the entire side face of the glass body becomes the transparent part, which means that the orientation of the image on the image display part can be changed at will to the horizontal direction by changing the orientation of the beam splitter to the horizontal direction. Also, the orientation of the image can be changed at will to the vertical direction by changing the orientation of the beam splitter to the vertical direction. This way, the user can enjoy the image not only from the side face of the glass, but also from the top opening through the drink.

Also, fixing the image display device (mobile communication device) on the side face of the glass body using a fixing mechanism eliminates the need, against convention, to lift the glass body when inserting or removing the image display device (mobile communication device), the result of which is the ability to answer an unexpected incoming call.

Insertion and removal will be made easier when an insertion opening through which to insert the image display device, and a storage part for storing the image display device, are used as the fixing mechanism.

Constituting the storage part 20 with a flexible material allows the image display device to be operated with the user's hand 50, etc., from the exterior of the storage part 20.

A majority of commercially available smartphones, mobile phones, and other communication devices have an acceleration sensor inside. Because an acceleration sensor is capable of capturing acceleration along three axes, the data acquired by the acceleration sensor can be used to detect user operations performed on the glass body. Furthermore, an output signal can be transmitted to an external computer at the timing of detection of a user operation. This makes it possible to change the image displayed on the image display part, or change the voice output from the voice output part, of a personal computer, server, mobile phone, smartphone, etc., in a remote location at the timing of performance, by the user, of an operation of tilting the drinking dramatization glass proposed by the present invention or clinking it against other objects (toasting operation). Also, the number of toasting operations can be tallied and published by a remote server.

If the mobile communication device has a camera, images captured by the camera can also be forwarded to remote locations.

If the mobile communication device has a vibrator, the vibrator may be vibrated at the timings of transmitting and receiving data. If the drink filled in the glass body is a carbonated drink, this vibration can produce the dramatizing effect of fizzing.

The drinking dramatization glass proposed by the present invention has an image display device fixed on the side face of the glass body, and uses a spectroscope (beam splitter in a stricter sense) placed in the glass body to spectrally disperse the image on the image display part into a transmitted wave and a reflected wave. The two images resulting from the spectral dispersion by the beam splitter pass simultaneously through two different areas of the transparent part of the glass body and reach the exterior of the glass body to be viewed by two or more users. The image display device may be a part of a mobile communication device.

With the drinking dramatization glass proposed by the present invention, there is no need, against convention (refer to Japanese Patent No. 6488049 and Japanese Patent No. 6528162 for details), to place a breakable reflective mirror, spectroscope, beam splitter, etc., inside the glass body, which eliminates the danger of any of these getting damaged when the drink in the glass body is stirred, while also allowing for reduction of weight of the glass body by the weight of the metal reflective mirror, glass beam splitter, etc., which is no longer necessary.

Also, the beam splitter in the drinking dramatization glass proposed by the present invention is a drink and thus drinkable.

Also, the drinking dramatization glass proposed by the present invention, as it uses a drink itself as a reflective mirror or beam splitter, allows for adjustment, at will, of the ratio of brightness between the reflected image and the transmitted image resulting from the spectral dispersion inside the glass, through adjustment of the color or optical transparency of the drink (that is, a drink also functions as a beam splitter or reflective mirror depending on the color and degree of optical transparency of the drink).

If it is desired to conceal from third parties around the glass body the transmitted image of the image from the mobile communication device, then black coffee, dark beer or other drink with lower optical transparency can be used as a beam splitter to cancel the transmitted image and project only the reflected image to the user.

Since the beam splitter in the glass body is constituted by a frozen drink, the user can eat, or let it melt and drink, the beam splitter. Also, beam splitters having various angles of reflection, reflectivities, and transmissivities can be made from desired soft drinks in a home refrigerator.

Since the reflected image and the transmitted image are horizontally or vertically and horizontally flipped versions of each other, allowing the flipped state of an image to be changed instantly using an image flipping program, etc., depending on whether the user primarily views the reflected image or primarily views the transmitted image, can achieve a greater convenience to the user. A curved part that curves convexly toward the outer side of the glass body can be provided at the position of the transparent part on the side face of the glass where the transmitted image passes through, so as to make a part of the drink L function as a convex lens to magnify the transmitted image for display. Dramatization is possible, whereby the magnification factor of the transmitted image is changed according to the type of the drink L.

With the drinking dramatization system proposed by the present invention, the reflected image can be reflected so that letters and objects of specific colors are emphasized or made invisible, by switching between drinks of various colors.

BRIEF DESCRIPTION OF THE DRAWINGS

FIG. 1 A perspective view (a), and a top cross-sectional view (b), showing the drinking dramatization glass in the first embodiment.

FIG. 2 Top cross-sectional views (a), (b), and a perspective view (c), of examples of patterns in which the angle of the beam splitter is changed.

FIG. 3 Perspective views (a), (b) showing a mode where the transparent part does not have lens function, and a mode where it has lens function, respectively.

FIG. 4 A perspective view showing a bottle-type drinking dramatization glass.

FIG. 5 An example of using a flexible material for the storage part to make push operations on the touch panel possible.

FIG. 6 An example of fixing an image display device on the glass body using a fixing mechanism.

FIG. 7 A perspective view showing the drinking dramatization glass in the second embodiment.

FIG. 8 A drawing showing a state where a drinking dramatization glass and others are connected to a communication line.

FIG. 9 A block diagram showing the internal system constitution of a drinking dramatization glass that detects the operated state of the glass using an acceleration sensor and transmits a signal.

FIG. 10 A block diagram showing the internal system constitution of a drinking dramatization glass that vibrates a vibrator when a communication is transmitted or received.

FIG. 11 Examples (a), (b) of providing a detachable light-blocking layer on the beam splitter to enable ON-OFF switching of the transmitted image.

FIG. 12 A drawing showing the constitution of the drinking dramatization system in the first embodiment (an example of changing the image on an external image display device).

FIG. 13 A drawing explaining how the reflected image is flipped via the beam splitter.

FIG. 14 A flowchart of a horizontal image flipping program in a mobile communication device.

FIG. 15 A drawing showing a remote toast counter system.

FIG. 16 A perspective view showing the drinking dramatization glass in the fifth embodiment.

FIG. 17 Perspective views (a), (b), (c) of examples of drinking dramatization glass shapes.

FIG. 18 A perspective view showing the drinking dramatization glass in the sixth embodiment.

FIG. 19 A perspective view of an example of a drink freeze container for beam splitter.

FIG. 20 A perspective view showing the drinking dramatization glass in the seventh embodiment.

FIG. 21 A flowchart of an image flipping program.

FIG. 22 A perspective view showing the constitution of the drinking dramatization system in the third embodiment.

MODE FOR CARRYING OUT THE INVENTION

[First Embodiment of Drinking Dramatization Glass]

A first embodiment of the drinking dramatization glass proposed by the present invention is described below using drawings.

As shown in FIG. 1, the drinking dramatization glass 1 is roughly constituted by a glass body 10, a fixing mechanism 16, a beam splitter 30, and a transparent part 12.

The glass body 10 is a bottomed cylinder with a top opening 11, allowing a drink or other liquid L to be filled inside. The material for the glass body 10 may be glass, resin, ceramic, porcelain, etc., just like for general glasses.

The fixing mechanism 16 is a member for fixing an image display device 80 on the side face of the glass body 10. In this embodiment, an insertion opening 21 through which to insert the image display device 80, and a storage part 20 for storing the image display device 80, are provided as the fixing mechanism 16.

It should be noted that, while this embodiment assumes the image display device 80 is a smartphone or other mobile communication device 100, the image display device 80 is not limited to the foregoing and may be one without communication function but with a function to display an image 81 on an image display part 85. Details of the mobile communication device 100 will be explained in the second embodiment.

The beam splitter 30 is placed inside the glass body 10 and used for spectrally dispersing the image 81 (the letter "A" in this embodiment) displayed on the image display part 85 of the image display device 80 into a reflected image 83 and a transmitted image 84. The transmitted image and reflected image, as obtained by the spectral dispersion, pass through the transparent part, and reach the exterior of the glass body.

The beam splitter 30 is an optical device that splits a flux of light (light incident on the beam splitter 30) into two (or three or more). A part of the light incident on the beam splitter 30 reflects, while a part of it transmits through. In general, it is used for optical pickups, reflective liquid crystal projectors, optical communication equipment, photon random number generators, etc. Under the present invention, the spectral function of the beam splitter 30 is used to spectrally disperse the light forming the image 81 displayed on the image display part 85 of the image display device 80, into a reflected image 83 and a transmitted image 84.

The transparent part 12 is provided on the side face of the glass body 10 to allow multiple (two, in this embodiment) users U to view the image 81 (reflected image 83 and transmitted image 84) from the exterior. Each user U can view the image 81 (reflected image 83 and transmitted image 84) on the image display device 80 as stored in the storage part 20, from the side face of the glass body 10 via the beam splitter 30 and through the transparent part 12. It should be noted that, if the glass body 10 is a mug type with a handle 13, a handle 13 made of a transparent material should be used so that the viewing of the image 84 transmitting through the beam splitter 30 will not be obstructed by the handle 13.

The optical path connecting the image display device 80 and the beam splitter 30, and the one connecting the beam splitter 30 and the transparent part 12, travel through the drink L in the glass body 10. If the drink L is whiskey or otherwise amber in color, the image viewed by the user U through the transparent part 12 takes on the color of this drink L, which achieves the dramatizing effect of coloring the image according to the color of the drink L filled in the glass body 10. It should be noted that the arrows in FIG. 1 (b) indicate the optical paths in the beam splitter 30. As it is made incident on the beam splitter, the image 81 on the image display device 80 is spectrally dispersed into two images, via the beam splitter 30, to become a reflected image 83 and a transmitted image 84.

Based on the basic law of physics in optical science that the angle of incidence equals the angle of reflection for any given light, an ideal angle is obtained as 45 degrees for both the angle formed by the image display part 85 of the image display device 80 and the beam splitter 30, and the angle formed by the beam splitter 30 and the transparent part 12, as shown in FIG. 1 (b). By setting these angles to 45 degrees, the multiple users U can simultaneously view the undistorted reflected image 83 and transmitted image 84 from the side face of the glass body 10. It should be noted that, in FIG. 1 (a), the symbol 82 indicates the image reflected on the beam splitter 30, of the image 81, as viewed from the user U looking at the reflected image 83.

It should be noted that the reflected image 83 actually seen through the transparent part 12 has been reflected on the beam splitter 30 and thus horizontally flipped (as a mirror copy); however, this can be resolved by horizontally flipping the image 81 beforehand through image processing on the image display device 80 side. Still, the flipping also flips the transmitted image 84, and therefore flipping is not required if the transmitted image 84 is the primary target of viewing. Similarly, flipping is not required for face photographs and images not containing horizontally asymmetrical letters that are little affected by a horizontal flipping of the image 81 as shown.

The user U cannot view the image if an optically non-transparent blocking object, such as a seal, sticker, fabric screen, etc., attached on the side face of the glass body 10, is present between the beam splitter 30 and the transparent part 12 to block off the optical path. Accordingly, consideration must be given to the shape of the glass body and the placement of any such blocking object so as not to block off the optical path between the reflected image 83 and the transmitted image 84 that have resulted from the spectral dispersion at the beam splitter 30.

By using the beam splitter 30, there is no longer a need, against convention, to place the image display device 80 inside the glass body 10. As a result, the image display device 80 can be easily removed and reinstalled from the side face of the glass body 10. Also, if the image display device 80 is a part of a smartphone or other mobile communication device 100, as is the case of this embodiment, the mobile communication device 100 is not placed in the drink L and therefore the mobile communication device 100 can always communicate regardless of whether the drink L is present or not. Accordingly, the user U can view, through the transparent part 12, various image contents that utilize the communication. It should be noted that the radio waves transmitted by mobile base stations around the world are vertically polarized waves that are vertical to the ground, which means that the radio wave reception sensitivity will improve when the mobile communication device 100 is placed vertically (or roughly vertically) to the liquid surface of the drink L, as shown in FIG. 1 (*a*), compared to when it is placed horizontally to the liquid surface of the drink L (placed on the bottom face or top face of the glass body 10, for example).

A structure may be provided, pertaining to a supporting mechanism 31 for supporting the beam splitter 30 inside the glass body 10, that allows the orientation of the beam splitter 30 to be changed the horizontal direction and/or the vertical direction. This way, the angle formed by the beam splitter 30 and the image display device 80 (image display part 85) can be adjusted arbitrarily, as shown in FIGS. 2 (*a*), (*b*), and the user U can view images from arbitrary positions around the glass body 10. When the angle formed by the beam splitter 30 is adjusted so as to reflect the image 81 in the direction of the top opening 11, as shown in FIG. 2 (*c*), the reflected image 83 will be viewed by the user U from the top opening 11 through the drink L in the glass body 10.

As shown in FIG. 3 (*b*), constituting the transparent part 12 as a glass lens or other lens mechanism 15, or fixing a lens mechanism 15 over the transparent part 12, allows the image 83 viewed from the exterior of the glass body 10 to be magnified for display.

Besides being a so-called mug type with a handle 13 as shown in FIG. 1, the shape of the glass body 10 may be a bottle type having a lid 10*a* for closing the top opening 11 as shown in FIG. 4.

As shown in FIG. 5, the material with which to constitute the storage part 20 may be polyethylene terephthalate used for PET bottles, etc., or other material having enough flexibility to deform when an external force is applied. In this case, the mobile communication device 100 can be pushed and operated by elastically deforming the storage part 20 via application of, from the exterior of the storage part 20, an external force by the user's hand 50 or finger or an object (a spoon, chopstick, etc., will be used for actual push operations, instead of human body parts, from the viewpoint of hygiene). Normally, smartphones and mobile phones have buttons and/or a touch panel, and these devices can be operated from the exterior of the glass body 10 while a drink is filled therein. It should be noted that, to facilitate the operations further, the storage part 20 may be partially formed with a clear soft vinyl chloride (commonly known as soft PVC, which is a waterproof material often used for float tubes) or other highly pliable material.

As shown in FIG. 6, the image display device 80 or mobile communication device 100 may be fixed on the glass body 10 using screws, clamps or other widely known means as the fixing mechanism 16, instead of using the storage part 20, etc. Also, the image display device 80 or mobile communication device 100 may be fixed on the glass body 10 by wrapping a rubber band or belt around it.

[Second Embodiment of Drinking Dramatization Glass]

A second embodiment of the drinking dramatization glass proposed by the present invention is explained below using drawings; it should be noted, however, that locations constitutionally identical to those in the drinking dramatization glass 1 in the aforementioned first embodiment are denoted with the same symbols and not explained.

As shown in FIG. 7, the user U can view, through the transparent part 12, various image content that utilizes the communication function of the mobile communication device 100.

The mobile communication device 100, which has an antenna 111, is a general term for devices that permit exchange of sound and image data (radio waves) among multiple such devices via a communication line A, such as mobile phones, smartphones, mobile tablet terminals, and PDAs, for example.

An image display part 101 outputs image content 150 and other images. A voice output part 102 is a so-called speaker for outputting voice content 151 and other sounds, as well as voices during calls, from the mobile communication device 100. A microphone 103 is a voice input device used during calls through the mobile communication device 100.

The communication line A may be the Internet or other network, or a telephone line and, as shown in FIG. 8, the drinking dramatization glass is connected to a personal computer, a remote server computer, the internal computer of other drinking dramatization glass(es), etc.

A majority of models of mobile phones, smartphones, and other mobile communication terminals have a built-in acceleration sensor. An acceleration sensor allows for acquisition, based on the acceleration of the object into which the acceleration sensor is built, of the amount of movement or tilting of the object, as well as whether or not the object has contacted another object.

The drinking dramatization glass in this embodiment has a user operation detection part 106 for monitoring the values of sensor-acquired data 160 of an acceleration sensor 105 in the mobile communication device 100, as shown in FIG. 9. A user operation of moving or tilting the glass body 10 or clinking it against other object is detected, and, at the timing of detection of the user operation, an operation detection signal 161 indicating that the user operation has been detected, or the sensor-acquired data 160, is transmitted, via a wireless communication device 110, to an external mobile communication device 202, remote server computer 203, etc.

The algorithm for detecting whether or not a user operation has been performed could conceivably be the simplest algorithm of detecting a moving operation, tilting operation, or clinking against another object based on whether or not the pre-determined threshold of acceleration generated by such operation has been exceeded; however, the algorithm is not limited to the foregoing, and other algorithm may be used. Also, the user operation detection part 106 may be installed in the internal computer 200 for control of the mobile communication device 100 as software, or built into the interior of the mobile communication device 100 as a dedicated IC.

This way, the image or sound on the external mobile communication device 202 can be controlled according to the user U's operation of the glass body 10. Also, operations of clinking the glass body 10 against other object (that is, toasting operations) can be monitored and tallied using the remote server computer 203, and the count published to the world in real time. It should be noted that, at the timing of detecting a user operation, an image near the glass body 10 may be captured using a camera 104 in the mobile communication device 100 so that it can be transmitted together with an operation detection signal 161 or sensor-acquired data 160.

Also, by outputting a vibrator control signal 162 to vibrate a vibrator 130 (commonly known as vibrator) in the mobile communication device 100 at the timing of transmitting an operation detection signal 161 or sensor-acquired data 160, the user can be notified of the transmission of operation detection signal 161 or sensor-acquired data 160.

[Third Embodiment of Drinking Dramatization Glass]

A third embodiment of the drinking dramatization glass proposed by the present invention is explained below using drawings; it should be noted, however, that locations constitutionally identical to those in the drinking dramatization glass in each of the aforementioned embodiments are denoted with the same symbols and not explained.

As shown in FIG. 10, when data has been transmitted or received via the wireless communication device 110, a vibrator control signal 162 can be output at this timing to vibrate the vibrator 130 in the mobile communication device 100, to notify the user of the transmission or reception of data by the mobile communication device 100. If a fizzy carbonated drink is filled inside the glass body 10, specific data can be transmitted to the mobile communication device 100 inside the glass body 10 from an external mobile communication device 202 or remote server computer 203, to vibrate the vibrator 130 in that mobile communication device 100 and thereby generate bubbles in the carbonated drink. In other words, generation of bubbles in the carbonated drink inside the glass body 10 in a remote location can be controlled from the mobile communication device 202, remote server computer 203, etc.

[Fourth Embodiment of Drinking Dramatization Glass]

Two problems arise when a beam splitter 30 is used as described in each of the aforementioned embodiments.

The first problem stems from the fact that the beam splitter 30 is constituted by an optically transparent object (dielectric material in a stricter sense) for the sake of splitting into two the light made incident on the beam splitter 30, and therefore light such as stray light from the illumination around the glass body 10, other image display devices, high-illumination light sources, and LEDs of other electronic devices, etc., is also made incident on the beam splitter 30 from behind to wash out the reflected image 83, which makes the drinking dramatization glass proposed by the present invention unsuitable for use other than in a completely dark environment or low-illumination environment.

The second problem relates to privacy because the transparent part 12 showing the reflected image 83 and transmitted image 84 means that the image display part 101 becomes unintentionally visible to third parties around the glass body 10.

To solve these problems, a detachable light-blocking layer 40 should be attached behind the beam splitter 30, as shown in FIG. 11 (b). By attaching the light-blocking layer 40, the beam splitter 30 can also be used as a normal mirror so that the user only needs to switch between a mode where the transmitted image 84 can be viewed by the user (ON), and a mode where it cannot be viewed by the user (OFF), at any timing as desired by the user. If a third party totally unrelated to the user U is present around the glass body 10, for example, the light-blocking layer 40 should be attached behind the beam splitter 30 to cancel the transmitted image 84. It should be noted that the light-blocking layer 40 may be a sheet-like flexible object or plate-like solid substance, and any material may be used so long as it can block off light. It should be noted that FIG. 11 assumes a normal glass whose entire glass body 10 is transparent.

[First Embodiment of Drinking Dramatization System]

A first embodiment of the drinking dramatization system proposed by the present invention is explained below. Elements constitutionally identical to those in the drinking dramatization glass in each of the aforementioned embodiments are denoted with the same symbols and not explained.

As explained in the second embodiment of a drinking dramatization glass, the drinking dramatization glass proposed by the present invention can detect a user operation performed on the glass body 10 using an acceleration sensor 105 in the mobile communication device 100, and transmit it as an output signal 161 to a remote server computer 203, etc. This system comprises, as shown in FIG. 12, the drinking dramatization glass 1 proposed by the present invention, an external image display device 205, and an external computer 204 (including, specifically, an external personal computer 201, remote server computer 203, etc.) for controlling the image thereon.

A user operation detected by the acceleration sensor 105 in the mobile communication device 100 is transmitted to the exterior through the wireless communication device 110, over the communication line A, as an output signal 161. The external computer 204 receives this output signal 161, and outputs an image content 152 according to the output signal 161 (the letters "go" in this embodiment) to the external image display device 205. This way, an operation of tilting or moving the glass or clinking it against other object (toasting operation) can be utilized to control the image currently output on the external image display device 205 such as a projector, large-screen display, etc. Also, the image output to the drinking dramatization glass 1 on which the operation was detected, and the image output to other drinking dramatization glass 2, can be synchronized using the glass tilting or moving operation, etc., as a trigger.

[Second Embodiment of Drinking Dramatization System]

A second embodiment of the drinking dramatization glass-based system proposed by the present invention is explained below. Elements constitutionally identical to those in the drinking dramatization glass in each of the aforementioned embodiments are denoted with the same symbols and not explained.

As explained in the aforementioned first embodiment, it is such that, while the user U is viewing an image via the beam splitter 30, the image 81 on the mobile communication device 100 is reflected via the beam splitter 30 and therefore the reflected image 83 entering the user U's eyes is horizontally flipped (as a mirror copy), as shown in FIG. 13. To avoid this, horizontal flipping should be performed on the image in the internal computer 200 of the mobile communication device 100.

FIG. 14 shows a flowchart of how the internal computer 200 operates when horizontally flipping an image.

In STEP 1, an original un-flipped image 81 is loaded from the memory of the internal computer 200. In STEP 2, a known horizontal image flipping process (such as a process to swap the left and right coordinates of all pixels in the image) is performed, to create a horizontally flipped image 86. Then, in STEP 3, this horizontally flipped image 86 is output.

[Embodiment of Remote Toast Counter System]

An embodiment of the remote toast counter system proposed by the present invention is explained below. Elements constitutionally identical to those in the drinking dramatization glass in each of the aforementioned embodiments are denoted with the same symbols and not explained.

As explained in the second embodiment of drinking dramatization glass, the drinking dramatization glass proposed by the present invention can detect a user operation performed on the glass body 10 using an acceleration sensor 105 in the mobile communication device 100, and transmit it to a remote server computer 203, etc. As shown in FIG. 15, a remote toast counter system can be obtained by setting up the remote server computer 203 to count the number of times the signal has been received and to record the result as a cumulative number of toast operations to be viewed and published.

[Fifth Embodiment of Drinking Dramatization Glass]

A fifth embodiment of the drinking dramatization glass proposed by the present invention is described below using drawings.

As shown in FIG. 16, the drinking dramatization glass 301 is roughly constituted by a glass body 310, a fixing mechanism 316, a drink L, a beam splitter 330, an inclined plane 317 (inclined relative to the image display part 385), and a transparent part 312.

The glass body 310 is a bottomed cylinder with a top opening 311, allowing a drink or other liquid L to be filled inside. The material for the glass body 310 may be glass, resin, ceramic, porcelain, etc., just like for general glasses.

The fixing mechanism 316 is a member for fixing an image display device 380 on the side face of the glass body 310. In this embodiment, an insertion opening 321 through which to insert the image display device 380, and a storage part 320 for storing the image display device 380, are provided as the fixing mechanism 316.

It should be noted that, for the image display device 380, an image display device built into a smartphone or other mobile communication device may be used.

The beam splitter 330 is constituted by the drink L, placed inside the glass body 310 and used for spectrally dispersing an image 381 (the letter "A" in this embodiment) displayed on an image display part 385 of the image display device 380 into a reflected image 383 and a transmitted image 384. The transmitted image and reflected image, as obtained by the spectral dispersion, pass through the transparent part, and reach the exterior of the glass body.

The beam splitter 330 is an optical device that splits a flux of light (light incident on the beam splitter 330) into two (or three or more). A part of the light incident on the beam splitter 330 reflects, while a part of it transmits through. In general, beam splitters are used for optical pickups, reflective liquid crystal projectors, optical communication equipment, photon random number generators, etc. Under the present invention, the spectral function of the beam splitter 330 is used to spectrally disperse the light forming the image 381 displayed on the image display part 385 of the image display device 380, into a reflected image 383 and a transmitted image 384. While a beam splitter is normally made of transparent glass or resin (acrylic, etc.), the drink dramatization glass 301 in this embodiment uses the drink L inside the glass body 310 itself as a beam splitter.

The drink L is positioned inside the glass body 310 and used as the beam splitter 330. This allows for adjustment of the ratio of brightness between the reflected image 383 and the transmitted image 384 resulting from spectral dispersion inside the glass, by adjusting the color or optical transparency of the drink L (the user only needs to adjust the color or color density of the drink), which is different from any normal beam splitter. For example, using coffee or other virtually optically non-transparent drink as the drink L allows only the transmitted image 384 to be made invisible. Also, there is no longer a need to place a normal beam splitter using glass, resin, etc., separately inside the glass body 310, which can make the glass lighter by the weight of the beam splitter and also safer. It should be noted that, because the optical refraction index of water is approx. 1.333 while the optical refraction index of glass is approx. 1.43 to 1.47, a normal (solid) beam splitter made of glass, acrylic, etc., is more advantageous to a beam splitter constituted by a drink L when maximum enhancement of reflectivity is desired (to make the reflected image 383 as clear as possible). If the top priority is safety and light weight in consideration of use by children, etc., a beam splitter constituted by a drink L or liquid should be used, as shown in FIG. 16.

The inclined plane 317, positioned in the area on which the image 381 of the drink L is made incident, is a flat surface that inclines with respect to the image display part 385 of the image display device 380 and is used as a surface on which the reflected image 383 reflects. Because the inclined plane 317 is inclined with respect to the image display part 385, the angle of incidence I of the image 381 on the drink L does not become 0 degrees, and therefore the user U can view the reflected image 383 from around the glass body 310. If there is no inclined plane 317 (if the angle of incidence I is 0 degrees), the image 381 projected from the image display part 385 ricochets and reflects off the drink L in the direction of the image display part 385 because the angle of incidence equals the angle of reflection, which means that the reflected image 383 is blocked by the image display device 380 and becomes difficult to view by the user U. For this reason, the inclined plane 317 is essential in viewing the reflected image 383. It should be noted that, in the example of FIG. 16, the method for providing the inclined plane 317 on the drink L is as follows: the image display part 385 is fixed in a manner inclined with respect to the liquid surface LB using hooks 322 with which the storage part 320 storing the image display device 380 is installed on the side face of the glass, as well as an angle adjustment mechanism 323, and the liquid surface LB is used as the inclined plane 317. Since the inclined plane 317 is flat, the reflected image 383 does not distort due to diffused reflection. If the inclined plane 317 includes a curved part or angled part, the reflected image 383 will distort as it reflects in various directions, and consequently the user U can no longer view the reflected image 383 normally. For this reason, it is essential that the inclined plane 317 is flat.

The transparent part 312 is provided on the side face of the glass body 310 to allow multiple (two, in this embodiment) users U to view the image 381 (reflected image 383 and transmitted image 384) from the exterior. Each user U can view the image 381 (reflected image 383 and transmitted image 384) on the image display device 380 as stored in the storage part 320, from the side face of the glass body 310 via the beam splitter 330 and through the transparent part 312. It should be noted that the glass need not be entirely transparent so long as the user U can view the reflected image 383 and transmitted image 384. It should be noted that the glass body 310 may be a mug type with a handle 313 for ease of holding.

The drink L itself serves as the beam splitter 330, and therefore, if the drink L is whiskey or otherwise amber in color, the image viewed by the user U through the transparent part 312 takes on the color of this drink L, which achieves the dramatizing effect of coloring the image according to the color of the drink L filled in the glass body 310. It should be noted that the arrows in FIG. 16 indicate the optical paths in the beam splitter 330. As it is made incident on the inclined plane 317 of the drink L serving as the beam splitter 330, the image 381 on the image display device 380 is spectrally dispersed into two images, via the beam splitter 330, to become a reflected image 383 and a transmitted image 384. Based on the basic law of physics in optical science that the angle of incidence equals the angle of reflection, the angle formed by the reflected image 383 and the transmitted image 384 can be adjusted by providing an angle adjustment mechanism 323 (hinge, etc.) at the storage part 320 and adjusting the angle formed by the inclined plane 317 and the image display part 385. It should be noted that, in FIG. 16, the symbol 382 indicates the image reflected on the beam splitter 330 (inclined plane 317 in a stricter sense), of the image 381, as viewed from the user U looking at the reflected image 383.

It should be noted that, since the reflected image 383 has been reflected on the beam splitter 330, it is a horizontally flipped version or vertically and horizontally flipped version (or mirror copy) of the image 381 or transmitted image 384; however, this can be resolved by horizontally or vertically and horizontally flipping the image 381 beforehand through image processing on the image display device 380 side. Still, the flipping also flips the transmitted image 384, and therefore flipping is not required if the transmitted image 384 is the primary target of viewing. It should be noted that, while applicable only to vertical flipping, the image display device 380 may be fixed beforehand to the storage part 320 in a vertically flipped state, as shown in FIG. 16, so that the reflected image 383 can be vertically flipped without having to flip it on the image processing software side. For this reason, a storage part 320, belt mechanism, etc., capable of fixing the image display device 380 in a vertically flipped state, as shown in FIG. 16, is desired for the fixing mechanism 316 for fixing the image display device 380 on the glass body 310. It should be noted that, in a use mode where the user U looks into the reflected image 383 inside the glass body 310 from the image display device 380 side, not from the glass body 310 side, the reflected image 383 and the transmitted image 384 do not flip vertically and therefore vertical flipping is not required.

FIG. 17 shows examples of shapes of the drinking dramatization glass proposed by the present invention.

As for the shape of the drinking dramatization glass 301, any shape may be used without any limitation so long as the drink L inside the glass body 310 is shaped to have an inclined plane 317.

For example, in FIG. 17 (a), the glass body 310 is inclined to provide an inclined plane 317, instead of causing the storage part 320 to be inclined as shown in FIG. 16. When an angle adjustment mechanism 323 is provided at the bottom part of the glass body 310, the angle of inclination 319 of the inclined plane 317 with respect to the image display part 385 can be freely adjusted, which in turn allows the angle of incidence of the image 381, or specifically the angle of reflection of the image 383, to be changed. For example, the angle of inclination 319 may be adjusted using the angle adjustment mechanism 323 so that the user U can view the reflected image 383 not only through the transparent part 312, but also from the top opening 311. It should be noted that a hinge or other known mechanism should be used for the angle adjustment mechanism 323.

In FIG. 17 (b), the side face of the glass body 310 has a flat part 318 that inclines with respect to the image display part 385 so as to provide the drink L with an inclined plane 317. This allows the drink L to have an inclined plane 317 without having to fix the image display device 380 in a manner projecting from the side face of the glass body 310 as shown in FIG. 16, which prevents the image display device 380 from contacting other objects and being damaged, and also saves the space otherwise occupied by the drinking dramatization glass 301. FIG. 17 (c) is the same as the drinking dramatization glass 301 in FIG. 17 (b), except that its shape has been changed to a bottle type with a lid 310a for closing off the top opening 311.

[Sixth Embodiment of Drinking Dramatization Glass]

The sixth embodiment of the drinking dramatization glass proposed by the present invention is explained below using drawings; it should be noted, however, that locations constitutionally identical to those in the drinking dramatization glass 301 in the aforementioned fifth embodiment are denoted with the same symbols and not explained.

As shown in FIG. 18, a drink L2 representing a drink L that has been frozen in a shape having an inclined plane 317 may be used as the beam splitter 330. Since the drink L2 is frozen solid, and also because it is frozen in a manner already having an inclined plane 317, there is no need to fix the image display device 380 in an inclined state on the side face of the glass body 310 as shown in FIG. 16 illustrating the drinking dramatization glass 301 in the aforementioned fifth embodiment, nor provide an inclined flat part 318 on the side face of the glass body 310 as shown in FIG. 17 (b) or FIG. 17 (c); instead, all that is necessary is to put the frozen drink L2 into a drink L3 (liquid) in the glass body 310 having a normal cylindrical shape, and the boundary surface LB2 between the drink L2 constituting the inclined plane 317, and the drink L3, will be generated automatically. It should be noted that, if the same type of drink is used for the drink L2 and the drink L3, there is little reflection of the image 381 at the boundary surface LB2 and therefore the reflected image 383 becomes virtually invisible. For this reason, the color density of the drink L2 should be made darker than the drink L3 if the reflected image 383 is to be made clearly visible. For example, good visibility of the reflected image 383 can be achieved by using black coffee, dark beer, or other dark-colored drink with low optical transparency for the drink L2, while using a colorless distilled liquor, etc., for the drink L3.

Since the drink L3 gradually melts the drink L2, the dramatization where the reflected image 383 disappears over time is possible and, being ice, the drink L2 can cool the drink L3.

It should be noted that, in a use mode where the user U looks into the reflected image 383 inside the glass body 310 from the image display device 380 side, as shown in FIG. 18, the reflected image 383 and the transmitted image 384 do not flip vertically.

As shown in FIG. 19, the user can form a beam splitter 330 using a desired soft drink or alcoholic drink in a home refrigerator by using a drink freeze container 390 (die) for making a beam splitter 330. Furthermore, an inclined plane 317 of desired angle can be set when the drink L2 is frozen. It should be noted that the drink freeze container 390 must be a container whose shape allows the drink L to freeze in a shape having an inclined plane 317. Instead of freezing it in the drink freeze container 390, the drink L may be solidified using syrup, sugar, gelatin, or the like.

[Seventh Embodiment of Drinking Dramatization Glass]

The seventh embodiment of the drinking dramatization glass proposed by the present invention is explained below using drawings; it should be noted, however, that locations constitutionally identical to those in the drinking dramatization glass in each of the aforementioned embodiments are denoted with the same symbols and not explained.

As shown in FIG. 20, the transparent part 312 may have a curved part 315 that curves convexly toward the outer side of the glass body 310, at the position where the transmitted image 384 passes through. When the user U views the transmitted image 384 through the curved part 315, the transmitted image 384 looks magnified compared to the image 381. This is because the optical refraction index of water is approx. 1.333 which is higher than the refraction index of air, and therefore the convexly curved part makes the shape of the drink L the same as that of a plano-convex lens or biconvex lens, thus causing it to serve as a lens (convex lens in a stricter sense). However, because the optical refraction index of glass is approx. 1.43 to 1.47, a lens that uses the drink L as a refraction medium has a lower magnification factor than a normal convex lens made of glass. It should be noted that the shape of the curved part 315 is conceivably a hemisphere or other known convex lens shape.

Since the optical refraction index of ethyl alcohol or the refraction index of 20[%] sugar solution is approx. 1.36, the magnification factor increases when the drink L is a liquid to which alcohol or sugar has been added, compared to when regular water or city water is used. Accordingly, the dramatization is possible where the magnification factor of the transmitted image 384 is adjusted by changing the alcohol concentration or sweetness of the drink L.

FIG. 21 shows an example of a flowchart for a computer program that horizontally flips or vertically flips the aforementioned image, for use with the drinking dramatization glass 301 in any of the fifth through seventh embodiments mentioned above.

First, in STEP 1, data of the image 381 is acquired; next, in STEP 2, the image 381 is horizontally flipped or vertically and horizontally flipped as necessary; finally, in STEP 3, the flipped image is output to the image display device 380, and the program ends. It should be noted that, for the sake of greater convenience, an image flipping button may be provided on the image display device 380 so that image flipping is performed at the timings of pressing the button. Also, for the sake of even greater convenience, an acceleration sensor may be provided in the image display device 380 so that flipping is performed at the timing of detecting a tilting of the glass body, or specifically at the timing when the user U is assumed to be tilting the glass and viewing the reflected image through the top opening or nearby transparent part 312 when drinking. The computer on which to run this image flipping program may be a dedicated IC, a computer in a mobile communication device, or a computer in a remote server.

The image flipping algorithm may be any known algorithm that swaps the X-direction and Y-direction coordinates of pixels in an image.

[Third Embodiment of Drinking Dramatization System]

A third embodiment of the drinking dramatization system proposed by the present invention is explained below. Locations constitutionally identical to those in the drinking dramatization glass in each of the aforementioned embodiments are denoted with the same symbols and not explained.

As shown in FIG. 22, the drinking dramatization system 400 in this embodiment uses the drinking dramatization glass 301 in any one of the aforementioned embodiments, and a colored drink as the drink L. Colored drinks include all drinks except for water, pure water and other colorless, clear drinks, the specific examples of which include coffee, dark beer and other dark drinks, tomato juice, red wine and other red-colored drinks, as well as whiskey, beer and other golden or amber-colored drinks.

As explained in the aforementioned fifth embodiment of drinking dramatization glass, the drinking dramatization glass proposed by the present invention uses a drink L as a beam splitter 330 and thus allows the reflected image 383 to be colored by various drinks L, which means that, by using this feature, the dramatization where a specific color of the reflected image 383 is emphasized becomes possible. As shown in FIG. 22, for example, a dark liquid (such as coffee, etc.) can be used as the drink L when the image 381 is a white-colored character image so that, on the reflected image 383, the white area of the image 381 is emphasized by the dark drink L and thus becomes clearly visible. Also, the white-colored area of the image 381, or the letter "A," can be made virtually invisible when a white-colored drink (milk, etc.) is used as the drink L. As described, the drinking dramatization system 400 in this embodiment allows the reflected image 383 to be reflected in a manner emphasizing or cancelling letters and objects of specific colors in the image 381 by changing the drink L to those having various colors. As a result, the dramatization where the same image 381 is presented differently or at changing contrast levels depending on the drink L is possible.

INDUSTRIAL FIELD OF APPLICATION

The present invention relates to a drinking dramatization glass that lets an individual enjoy oneself together with others in remote locations and presents many different dramatizing effects. Additionally, the present invention relates to a drinking dramatization glass that allows an image display device to be fixed with ease on the glass body and the orientation of an image display part of the image display device to be changed with ease, and further allows multiple people to view an image at the same time. Additionally, the present invention relates to a drinking dramatization system and a remote toast counter system, both using such drinking dramatization glasses, as well as a storage medium for use therewith. Additionally, the present invention relates to a drinking dramatization glass and a drinking dramatization system, both designed to use a beam splitter constituted by drinking water to spectrally disperse or reflect an image from the image display device on the side face of the glass, as well as a storage medium and a drink freeze container, both for use with such drinking dramatization glass and drinking dramatization system. Based on the above, the present invention has industrial applicability.

DESCRIPTION OF THE SYMBOLS

A Communication line
L Liquid (drink)
L2 Drink (solid)
L3 Drink (liquid)
LB Liquid surface
LB2 Boundary surface
I Angle of incidence U User
1 Drinking dramatization glass
2 Drinking dramatization glass
10 Glass body
11 Top opening
12 Transparent part
13 Handle (transparent)
10a Lid
15 Lens mechanism
16 Fixing mechanism
20 Storage part
21 Insertion opening
30 Beam splitter
31 Supporting mechanism
40 Light-blocking layer
50 User's hand
80 Image display device
81 Image
82 Image
83 Reflected image
84 Transmitted image
85 Image display part
86 Horizontally flipped image
100 Mobile communication device
101 Image display part
102 Speaker
103 Microphone (sound sensor)
104 Camera (camera sensor)
105 Acceleration sensor
106 User operation detection part
110 Wireless communication device
111 Antenna
130 Vibrator
150 Image content
151 Voice content
152 Image content (for external image display device)
160 Sensor-acquired data
161 Output signal (operation detection signal, etc.)
162 Vibrator control signal
200 Internal computer (control part)
201 Personal computer
202 External mobile communication device
203 Remote server computer
204 External computer
205 External image display device
301 Drinking dramatization glass
310a Lid
310 Glass body
311 Top opening
312 Transparent part
313 Handle (transparent)
315 Curved part
316 Fixing mechanism
317 Inclined plane
318 Flat part
319 Angle of inclination
320 Storage part
321 Insertion opening
322 Hook
323 Angle adjustment mechanism
330 Beam splitter
380 Image display device
381 Image
382 Image
383 Reflected image
384 Transmitted image
385 Image display part
390 Drink freeze container
400 Drinking dramatization system

What is claimed is:

1. A drinking dramatization glass, comprising:
a glass body being a bottomed cylinder with a top opening;
a fixing mechanism for fixing an image display device on a side face of the glass body;
a transparent part for viewing, from an exterior of the glass body, an image displayed on an image display part of the image display device; and
a beam splitter placed inside the glass body;
characterized in that the image displayed on the image display part is spectrally dispersed into two images, wherein the two images are a reflected image and a transmitted image, by the beam splitter, and the reflected image and transmitted image pass through the transparent part and reach the exterior of the glass body.

2. The drinking dramatization glass according to claim 1, characterized in that the image display device is a part of a mobile communication device.

3. The drinking dramatization glass according to claim 1, characterized in that a part or all of the transparent part constitutes a lens so that the image display part can be magnified for viewing from the exterior of the glass body.

4. The drinking dramatization glass according to claim 1, characterized in that an orientation of the beam splitter can be changed in a horizontal direction and/or a vertical direction.

5. The drinking dramatization glass according to claim 1, characterized in that the beam splitter has a detachable light-blocking layer and, when the light-blocking layer is attached to the beam splitter, the beam splitter can be utilized as a reflective mirror.

6. The drinking dramatization glass according to claim 1, characterized in that the glass body has a transparent handle.

7. The drinking dramatization glass according to claim 1, characterized in that the fixing mechanism comprises an insertion opening through which to insert the image display device, and a storage part for storing the image display device, and the storage part is made of a flexible material so that, by applying an external force, the storage part can be deformed to operate the image display device in the storage part.

8. The drinking dramatization glass according to claim 1, characterized by having a lid for closing off the top opening.

9. The drinking dramatization glass according to claim 1, characterized in that the image display device is a part of a mobile communication device, the mobile communication device has a user operation detection part and an acceleration sensor, and the user operation detection part detects, based on output data from the acceleration sensor, whether a user has moved or tilted the glass body or clinked it against other object (hereinafter referred to as "user operation") and transmits an output signal to the exterior.

10. The drinking dramatization glass according to claim 1, characterized in that the image display device is a part of a mobile communication device, the mobile communication device has a vibrator, and the vibrator vibrates at a timing of communication performed by the mobile communication device via radio waves, thereby causing the glass body to vibrate.

11. The drinking dramatization glass according to claim 9, characterized in that the mobile communication device has a camera, and the camera captures an image at a timing of detection of the user operation by the user operation detection part and transmits the captured image data to the exterior.

12. A drinking dramatization system comprising the drinking dramatization glass according to claim 9, an external computer, and an exterior image display device; characterized in that the exterior computer, upon receiving the output signal, generates prescribed image data and transmits it to the external image display device, and the external image display device displays the image data as image content.

13. A remote toast counter system comprising the drinking dramatization glass according to claim 9, and an external server computer; characterized in that the external server computer receives the output signal, counts a number of times the signal has been received, and records a result as a cumulative number of toasting operations, so that the user can view the cumulative number of toasting operations.

14. A storage medium in which a computer program for use with the drinking dramatization glass according to claim 1 is saved; the storage medium characterized in that the computer program horizontally flips the image.

* * * * *